(12) United States Patent
Merriman et al.

(10) Patent No.: US 8,479,151 B2
(45) Date of Patent: Jul. 2, 2013

(54) CONVERTING A STATECHART FROM A FIRST STATECHART FORMAT TO A SECOND STATECHART FORMAT

(75) Inventors: David J. Merriman, Leander, TX (US); Nikhil Venkatesh, Bangalore (IN); Nicholas G. Neumann, Round Rock, TX (US); Ritesh K. Soni, Tezpur (IN); Christina M. Dellas, Austin, TX (US); Praveen Shivananda, Bangalore (IN)

(73) Assignee: National Instruments Corporation, Austin, TX (US)

( * ) Notice: Subject to any disclaimer, the term of this patent is extended or adjusted under 35 U.S.C. 154(b) by 519 days.

(21) Appl. No.: 12/778,826

(22) Filed: May 12, 2010

(65) Prior Publication Data

US 2011/0283254 A1 Nov. 17, 2011

(51) Int. Cl.
*G06F 9/44* (2006.01)
*G06F 9/45* (2006.01)

(52) U.S. Cl.
USPC ............ 717/104; 717/105; 717/113; 717/140

(58) Field of Classification Search
None
See application file for complete search history.

(56) References Cited

U.S. PATENT DOCUMENTS

| | | | |
|---|---|---|---|
| 4,914,568 A | 4/1990 | Kodosky et al. | |
| 5,452,206 A | 9/1995 | Turrietta et al. | |
| 5,825,356 A | 10/1998 | Habib et al. | |
| 5,918,233 A | 6/1999 | La Chance et al. | |
| 5,953,526 A | 9/1999 | Day et al. | |
| 5,974,257 A | 10/1999 | Austin | |
| 6,219,628 B1 | 4/2001 | Kodosky et al. | |
| 6,389,481 B1 | 5/2002 | Malcolm | |
| 6,452,607 B1 | 9/2002 | Livingston | |
| 6,505,342 B1 * | 1/2003 | Hartmann et al. | ............ 717/104 |
| 6,788,313 B1 | 9/2004 | Heil | |
| 6,799,198 B1 | 9/2004 | Huboi et al. | |
| 6,943,466 B2 | 9/2005 | Oohashi | |
| 6,981,207 B1 | 12/2005 | Bakman et al. | |
| 6,996,769 B1 | 2/2006 | Peikes et al. | |
| 7,016,062 B2 | 3/2006 | Ishizuka | |
| 7,114,149 B2 | 9/2006 | Aptus et al. | |

(Continued)

OTHER PUBLICATIONS

Jim Barnett et al.; State Chart XML (SCXML): State Machine Notation for Control Abstraction; Jan. 24, 2006; retrieved online on Feb. 19, 2013; pp. 1-32; Retrieved from the Internet: <http://www.w3.org/TR/2006/WD-scxml-20060124/>.*

(Continued)

*Primary Examiner* — Thuy Dao
*Assistant Examiner* — Hanh T Bui
(74) *Attorney, Agent, or Firm* — Meyertons Hood Kivlin Kowert & Goetzel, P.C.; Jeffrey C. Hood; Mark S. Williams

(57) ABSTRACT

System and method for converting a statechart from a first statechart development environment to a second statechart development environment. A first statechart may be received. The first statechart may be created in a first statechart development environment. The first statechart may implement a first functionality. The first statechart may be parsed to determine a plurality of elements of the first statechart. A markup language representation of the first statechart may be generated. The markup language representation may represent the plurality of elements of the first statechart. A second statechart may be generated based on the markup language representation. The second statechart may be in a second statechart development environment. The second statechart may implement the first functionality. The second statechart may be stored.

17 Claims, 23 Drawing Sheets

U.S. PATENT DOCUMENTS

| | | | |
|---|---|---|---|
| 7,162,387 B2 | 1/2007 | Johnson et al. | |
| 7,188,336 B2 | 3/2007 | Humphries | |
| 7,200,838 B2 | 4/2007 | Kodosky et al. | |
| 7,210,117 B2 | 4/2007 | Kudukoli et al. | |
| 7,503,027 B1 | 3/2009 | Zhao et al. | |
| 7,797,672 B2* | 9/2010 | Thompson et al. | 717/140 |
| 7,900,191 B1* | 3/2011 | Raghavan | 717/113 |
| 8,201,140 B2* | 6/2012 | Raghavan et al. | 717/104 |
| 8,214,796 B2* | 7/2012 | Neumann et al. | 717/105 |
| 8,266,584 B2* | 9/2012 | Hartadinata et al. | 717/113 |
| 8,302,019 B2* | 10/2012 | Litoiu et al. | 717/104 |
| 2002/0091993 A1 | 7/2002 | Walley et al. | |
| 2002/0100015 A1* | 7/2002 | Harel et al. | 717/104 |
| 2003/0014439 A1* | 1/2003 | Boughannam | 707/513 |
| 2003/0229608 A1 | 12/2003 | Reynar et al. | |
| 2004/0006480 A1 | 1/2004 | Ehlen et al. | |
| 2004/0088678 A1* | 5/2004 | Litoiu et al. | 717/104 |
| 2004/0139073 A1 | 7/2004 | Bauchot et al. | |
| 2005/0091602 A1* | 4/2005 | Ramamoorthy et al. | 715/763 |
| 2005/0144595 A1 | 6/2005 | McLean et al. | |
| 2005/0216891 A1 | 9/2005 | Sundararajan et al. | |
| 2006/0059423 A1 | 3/2006 | Lehmann et al. | |
| 2006/0079752 A1 | 4/2006 | Anderl et al. | |
| 2006/0150090 A1 | 7/2006 | Swamidass et al. | |
| 2006/0259861 A1 | 11/2006 | Watson | |
| 2006/0265232 A1 | 11/2006 | Katariya et al. | |
| 2007/0150859 A1 | 6/2007 | Kodosky et al. | |
| 2007/0214427 A1 | 9/2007 | Peck et al. | |
| 2007/0239628 A1 | 10/2007 | Peck et al. | |
| 2007/0277151 A1* | 11/2007 | Brunel et al. | 717/113 |
| 2007/0282570 A1* | 12/2007 | Thompson et al. | 703/2 |
| 2007/0288885 A1* | 12/2007 | Brunel et al. | 717/104 |
| 2008/0147364 A1* | 6/2008 | Davis et al. | 703/6 |
| 2008/0263463 A1 | 10/2008 | Neumann | |
| 2008/0263512 A1* | 10/2008 | Dellas et al. | 717/105 |
| 2008/0263513 A1* | 10/2008 | Neumann et al. | 717/105 |
| 2008/0263515 A1 | 10/2008 | Dellas et al. | |
| 2009/0044171 A1* | 2/2009 | Avadhanula | 717/105 |
| 2010/0058289 A1* | 3/2010 | Hudson et al. | 717/105 |
| 2010/0153910 A1* | 6/2010 | Ciolfi et al. | 717/105 |
| 2010/0275181 A1* | 10/2010 | Mercer et al. | 717/140 |
| 2010/0275187 A1* | 10/2010 | Mercer et al. | 717/140 |
| 2010/0325617 A1* | 12/2010 | Hudson et al. | 717/140 |

OTHER PUBLICATIONS

Dandan Gao et al.; Indexing Temporal XML Using Interval-Tree index; 2008; IEEE; retrieved online on Feb. 19, 2013; pp. 689-691; Retrieved from the Internet: <http://ieeexplore.ieee.org/stamp/stamp.jsp?tp=&arnumber=4722712>.*

Mahesh Shirole; Generation of Improved Test Cases from UML State Diagram Using Generic Algorithm; 2011; ACM; retrieved online on Feb. 19, 2013; pp. 125-134; Retrieved from the Internet: <http://delivery.acm.org/10.1145/1960000/1953374/p125-shirole.pdf?>.*

"Code Documentation Generator for .NET"; NDoc—.NET Code Documentation Generator; Retrieved from the Internet: http://ndoc.sourceforge.net/usersguide.html; Dec. 17, 2004; 1 page.

"What's new in NDoc 1.3?"; NDoc—.NET Code Documentation Generator; Retrieved from the Internet: http://ndoc.sourceforge.net/usersguide.html; Dec. 17, 2004; 7 page.

"Known Issues"; NDoc—.NET Code Documentation Generator; Retrieved from the Internet: http://ndoc.sourceforge.net/usersguide.html; Dec. 17, 2004; 2 page.

"Getting Started"; NDoc—.NET Code Documentation Generator; Retrieved from the Internet: http://ndoc.sourceforge.net/usersguide.html; Dec. 17, 2004; 2 page.

"Decorating Your Code"; NDoc—.NET Code Documentation Generator; Retrieved from the Internet: http://ndoc.sourceforge.net/usersguide.html; Dec. 17, 2004; 1 page.

"Tags Supported by NDoc"; NDoc—.NET Code Documentation Generator; Retrieved from the Internet: http://ndoc.sourceforge.net/usersguide.html; Dec. 17, 2004; 2 page.

"Attributes supported by NDoc"; NDoc—.NET Code Documentation Generator; Retrieved from the Internet: http://ndoc.sourceforge.net/usersguide.html; Dec. 17, 2004; 2 page.

"Creating an NDoc Project"; NDoc—.NET Code Documentation Generator; Retrieved from the Internet: http://ndoc.sourceforge.net/usersguide.html; Dec. 17, 2004; 2 page.

Microsoft Notepad Version 5.1, copyright 1981-2001 by the Microsoft Corporation. See Files notepad.pdf, notepad1.pdf, and notepad2.pdf for screenshots. 3 pages.

Microsoft Office Word Version 11.8134.8132, copyright 1983-2003 by the Microsoft Corporation. See Files Wordopentext2.pdf and Wordopentext4.pdf for screenshots. 2 pages.

IBM, "Algorithm for a Documentation Publishing System Preprocessor", Nov. 1, 1992, vol. 35, Issue 6, Disclosure Text. TBD-ACC-No. NN9211201. 2 pages.

U.S. Appl. No. 60/913,028, entitled "Configuring and Debugging a Statechart", by Nicholas G. Neumann and Toga Hartadinata, filed Apr. 20, 2007.

"Report Generator for Use with MATLAB and Simulink—User's Guide Version 1"; The Mathworks; Jan. 1999; 367 pages.

"SCXML"; Wikipedia; Obtained from Internet: <http://en.wikipedia.org/wiki/SCXML>; Sep. 13, 2006; 4 pages.

"Simulink Report Generator 3 User's Guide—Using the XML Comparison Report"; The Mathworks; Mar. 2010; 6 pages.

* cited by examiner

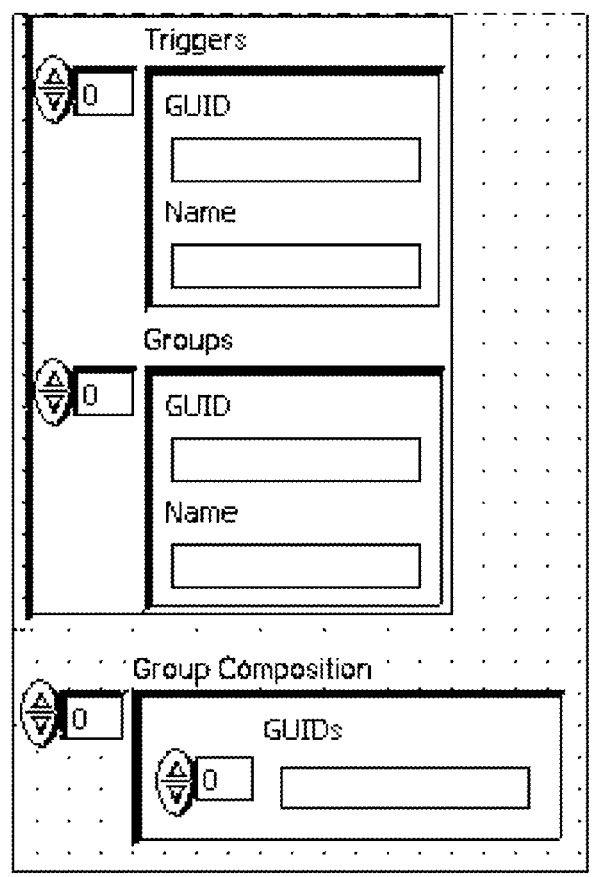
FIG. 12
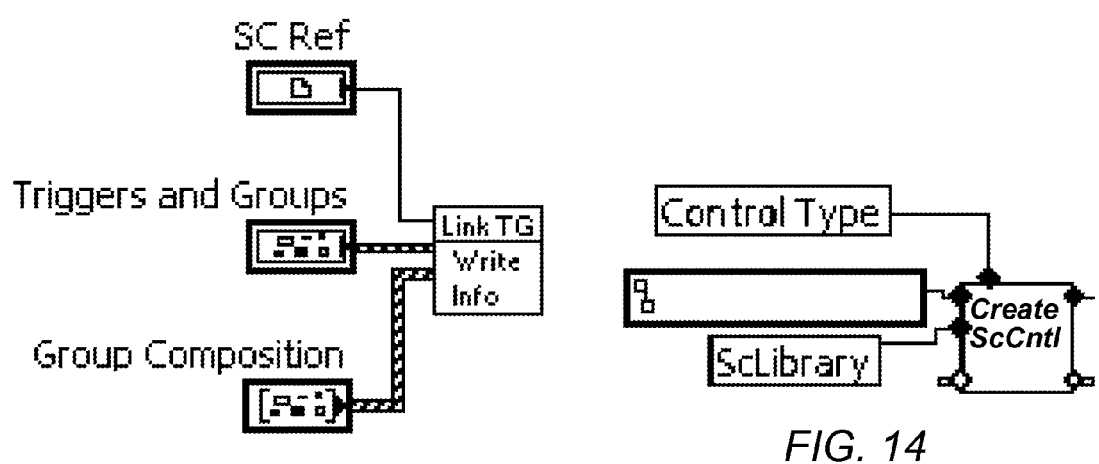
FIG. 13
FIG. 14

CONVERTING A STATECHART FROM A FIRST STATECHART FORMAT TO A SECOND STATECHART FORMAT

FIELD OF THE INVENTION

The present invention relates to the field of computer software. More particularly, the invention relates to software that converts a statechart from a first statechart development environment to a second statechart development environment.

DESCRIPTION OF THE RELATED ART

Traditionally, text-based programming languages have been used by programmers in writing application programs. Many different text-based programming languages exist, including BASIC, C, C++, Visual C++, Java, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Various programming models and paradigms that enable a user to create a program in a graphical manner without necessarily writing source code in a text-based programming language have been developed. In particular, graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

A particular way of graphically prototyping or specifying program functionality is by creating a statechart. A statechart is a diagram that visually indicates a plurality of states and transitions between the states. The diagram comprises state icons connected by wires, where the state icons represent states and the wires represent transitions between the states. One or more of the state icons may represent a hierarchical state, where a hierarchical state is a state that includes one or more sub-states.

Currently, there are multiple different formats for statecharts. For example, many different software vendors have each developed their own format for statecharts. This has lead to problems of interoperability of statechart software with statecharts of different formats; for example, statecharts created using one statechart development environment may typically not be used with a different statechart development environment. Thus, improvements in statechart interoperability would be desirable.

SUMMARY

Embodiments are presented of a system and method for converting a statechart from a first statechart format to a second statechart format. The ability to convert statecharts from one statechart format to another may help with problems of interoperability of statechart software with statecharts of various formats. The method may be computer implemented, e.g., may be implemented by a computer system including a processor and a memory medium, where the memory medium includes program instructions executable by the processor to implement the method. Embodiments are also contemplated which are directed to a computer system which is configured to implement the method, and to a computer readable memory medium including program instructions executable to implement the method. According to some embodiments, the method may operate as follows.

A first statechart may be received. The first statechart may have been created in a first statechart development environment. The first statechart may implement a first functionality. The first statechart may include a plurality of elements. For example, the first statechart may include a plurality of state icons and a plurality of connector elements (e.g., wires) interconnecting the state icons. The state icons may represent a plurality of states, while the connector elements represent transitions between the states.

In some embodiments, the plurality of elements may include various other elements in addition to the state icons and connector elements. For example, the statechart may include one or more data controls, guards, or actions. Other elements are also possible. In some embodiments, some or all of these data controls, guards, and/or actions may be specified in a textual language.

The first statechart may be parsed. Parsing the first statechart may include determining the plurality of elements of the first statechart. A markup language representation of the determined elements of the first statechart may be generated, e.g., based on having parsed the first statechart. In some embodiments, the markup language representation may be generated according to a markup language schema (e.g., a schema defined to represent possible elements of a statechart). In some embodiments, the markup language representation may be an eXtensible Markup Language (XML) representation. Other markup language representations are also contemplated.

In some embodiments, e.g., if the first statechart includes data control, guard, and/or action elements specified in a textual language, one or more graphical data flow diagrams may be generated. The one or more graphical data flow diagrams may specify the data control, guard, and/or action elements specified in the textual language of the first statechart.

The parsing of the first statechart and the generation of the markup language representation may be performed by software execution, i.e., automatically. In other words, the parsing of the first statechart and the generation of the markup language representation may be performed by software without requiring any user input or interaction to accomplish these steps. In addition, if applicable, the graphical data flow diagram(s) may be generated automatically by software based on the data control, guard, and/or action elements that are determined (by software) to be present in the first statechart. In other words, the graphical data flow program(s) may be generated by software, without user input required to create or assemble the graphical data flow program(s).

A second statechart may be generated based on the markup language representation. The second statechart may be for use in a second statechart development environment. The second statechart may also implement the first functionality. In some embodiments, in generating the second statechart, the one or more graphical data flow diagrams specifying the one or more data controls, guards, or actions may also be included in the second statechart. The generation of the second statechart based on the markup language representation may be performed by software (automatically), without user input required to create the second statechart.

In some embodiments, generating the second statechart based on the markup language representation may be performed by an application programming interface (API). The API may determine whether the markup language representation is valid, e.g., according to a markup language schema. The API may also determine whether the first statechart represented by the markup language representation is a valid statechart. In some embodiments, the API may only generate the second statechart if the API determines that the markup language representation is valid and that the first statechart is a valid statechart. If the markup language representation is not valid according to the markup language schema or the first statechart is not a valid statechart, the API may generate an error message (e.g., informing a user that the markup language representation is not valid and/or the first statechart is not a valid statechart). In some embodiments, the API may be a graphical data flow API.

The second statechart may be stored, e.g., in a memory of a computer system, such as a computer system on which the method that generated the second statechart was performed, or a different computer system. In some embodiments, the second statechart may also or alternatively be displayed upon being generated, e.g., on a display device of a computer system. In some embodiments, the second statechart may then be modified or otherwise manipulated (e.g., using the second statechart development environment) by a user as desired.

As noted above, according to some embodiments, part or all of the method may be performed automatically by the computer system. In other words, some or all of the steps may be performed without user input explicitly specifying or performing those steps. For example, in some embodiments, user input may be received requesting that the first statechart be converted from the first statechart development environment to the second statechart development environment, and based on this, program instructions may be executed by the computer system to automatically receive the first statechart, parse the first statechart, generate the markup language representation of the first statechart, generate any graphical data flow diagrams specifying data controls, guards, and/or actions of the first statechart, and/or generate the second statechart, as described above according to any of various embodiments, without any further user input. Other embodiments, including differing amounts of user input, are also contemplated.

BRIEF DESCRIPTION OF THE DRAWINGS

A better understanding of the present invention can be obtained when the following detailed description of the preferred embodiment is considered in conjunction with the following drawings, in which:

FIG. 12 illustrates a trigger/group cluster according to one embodiment;

FIG. 13 illustrates an API for writing trigger/group information into a statechart according to one embodiment;

FIG. 14 illustrates an API for creating controls for a statechart according to one embodiment;

Figure 1:
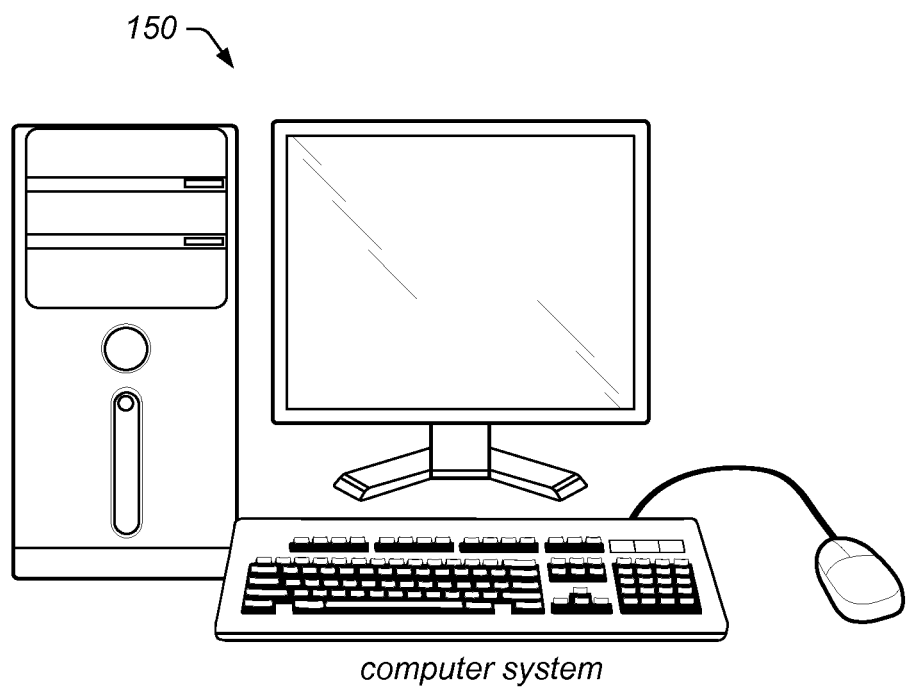
FIG. 1 illustrates an example of a computer system that may be configured to implement embodiments of the disclosure.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. patent application Ser. No. 11/748,822, now U.S. Pat. No. 8,108,833, titled "Automatically Generating a Graphical Data Flow Program from a Statechart", whose inventors are Christina M. Dellas, Nicholas G. Neumann, Toga Hartadinata, and Kevin M. Hogan, which was filed on May 15, 2007.

U.S. patent application Ser. Nos. 11/748,866 11/743,287, now U.S. Pat. No. 8,387,002, titled "Statechart Development Environment with Embedded Graphical Data Flow Code Editor", whose inventors are Christina M. Dellas and Kevin M. Hogan, which was filed on May 15, 2007.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes (not to be confused with the nodes that connect components in a circuit diagram).

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Statechart—A diagram that visually indicates a plurality of states and transitions between the states. The diagram comprises state icons connected by wires, where the state icons represent states and the wires represent transitions between the states.

One or more of the state icons may represent a hierarchical state, where a hierarchical state is a state that includes one or more sub-states. For example, a statechart may include a state (a superstate) which includes states (sub-states). The sub-states may be AND states (e.g., parallel or concurrently active states) or OR states (e.g., states which are not concurrently active). The statechart may also include pseudostates (e.g., forks, joins, and/or junctions).

The statechart may be represented in the memory of the computer system as data structures and/or program instructions. The representation of the statechart stored in memory corresponds to the diagram and is either 1) executable; 2) operable to be converted to an executable program; or 3) interpretable, to perform the functionality indicated by the diagram.

A "State Diagram" is a type of statechart which does not have hierarchical states.

A statechart development environment may enable a user to create or modify a statechart, in many cases in a graphical manner. For example, a statechart development environment may include a graphical editor and/or a GUI that enables the user to create the statechart by displaying and arranging state icons in the statechart, where each state icon represents a state. The graphical editor may also enable the user to display wires (also referred to as connector elements) that interconnect the state icons. Each wire (or connector element) may connect two state icons and represent a transition between the two states represented by the state icons.

Various development environments exist for creating and modifying statecharts. For example, different software vendors such as National Instruments Corporation, The Mathworks, and others each offer statechart development environments as part of their respective suites of software products. The various statechart development environments themselves may be implemented in numerous possible ways. U.S. patent application Ser. No. 11/748,822, titled "Automatically Generating a Graphical Data Flow Program from a Statechart", and U.S. patent application Ser. No. 11/748,866, titled "Statechart Development Environment with Embedded Graphical Data Flow Code Editor", both incorporated by reference above, describe a number of aspects of what functionality a statechart development environment may include, according to one set of embodiments. In addition, other embodiments may further or instead include a great variety of other possible functionalities and ways of implementing functionalities beyond those described in these documents.

It has conventionally been the case that statecharts developed in one statechart development environment may not be used or otherwise modified with a different statechart development environment. Thus in order to create or use a statechart according to a first statechart development, users have typically been required to purchase and install the first statechart development environment software. However, statechart development environment software typically requires a significant investment, both in terms of cost and time required to accustom oneself to use of the statechart development environment software. Thus, if a user has already invested a significant amount of time and/or money in second statechart development environment software, that user would likely find it desirable to be able to use the second statechart development environment software with the statechart according to a first statechart development environment, rather than to purchase and install the first statechart development environment software in addition to the second statechart development environment software. Accordingly, the present disclosure relates to a system and method for converting a statechart from a first statechart development environment to a second statechart development environment.

FIG. 1—Computer System

FIG. 1 illustrates an exemplary computer system that may be used to implement embodiments of the disclosure. The computer system 82 may include a memory medium(s) on which various computer programs, software components, and data structures are stored. In particular, the memory medium may store program instructions executable by one or more processors of the computer system 82 for converting a statechart from a first statechart development environment to a second statechart development environment, according to any of the various embodiments described herein. In some embodiments, the memory medium may include the first and/or the second statechart development environment application, which may be executable by one or more processors of the computer system 82. The memory medium may also store one or more data structures that represent a statechart according to the first statechart development environment (e.g., in a first statechart format), and/or one or more data structures that represent a statechart according to the second statechart development environment (e.g., in a second statechart format). The memory medium may also store operating system software, as well as other software for operation of the computer system.

As shown in FIG. 1, the computer system 82 may also include a display device operable to display a statechart and/or various elements of a statechart development environment. In addition, the computer system 82 may include at least one input device such as a mouse, keyboard, or other input device.

In some embodiments, the computer system 82 may be connected to a network (not shown), which may allow for connectivity between the computer system 82 and other computer systems and/or devices. The network may be any type of network, such as a local area network (LAN), a wide area network (WAN) such as the internet, or any other type of network, including a combination of multiple networks of similar or different types. Embodiments are contemplated in which part or all of the method described herein may be performed over a network (e.g., as part of a cloud computing environment); for example, a computer system 82 might request over a network that a first statechart be converted from a first statechart development environment to a second statechart development environment, and a server computer or other system across the network might provide program instructions for the computer system 82 to execute to perform the conversion, or may perform the conversion itself and return the converted statechart.

Figure 2:
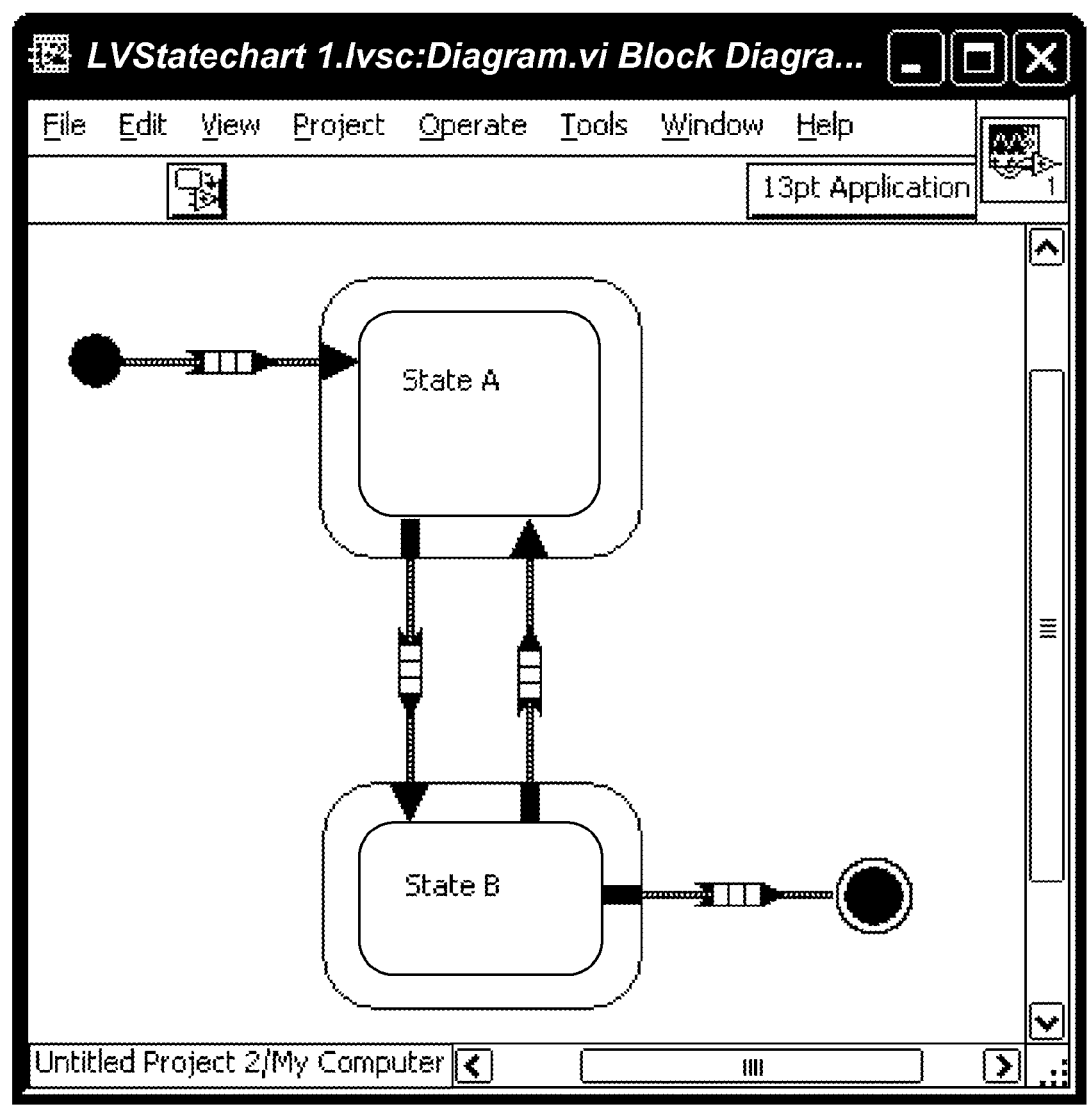
FIGS. 2-3 illustrate exemplary statecharts according to one embodiment.
Figure 3:
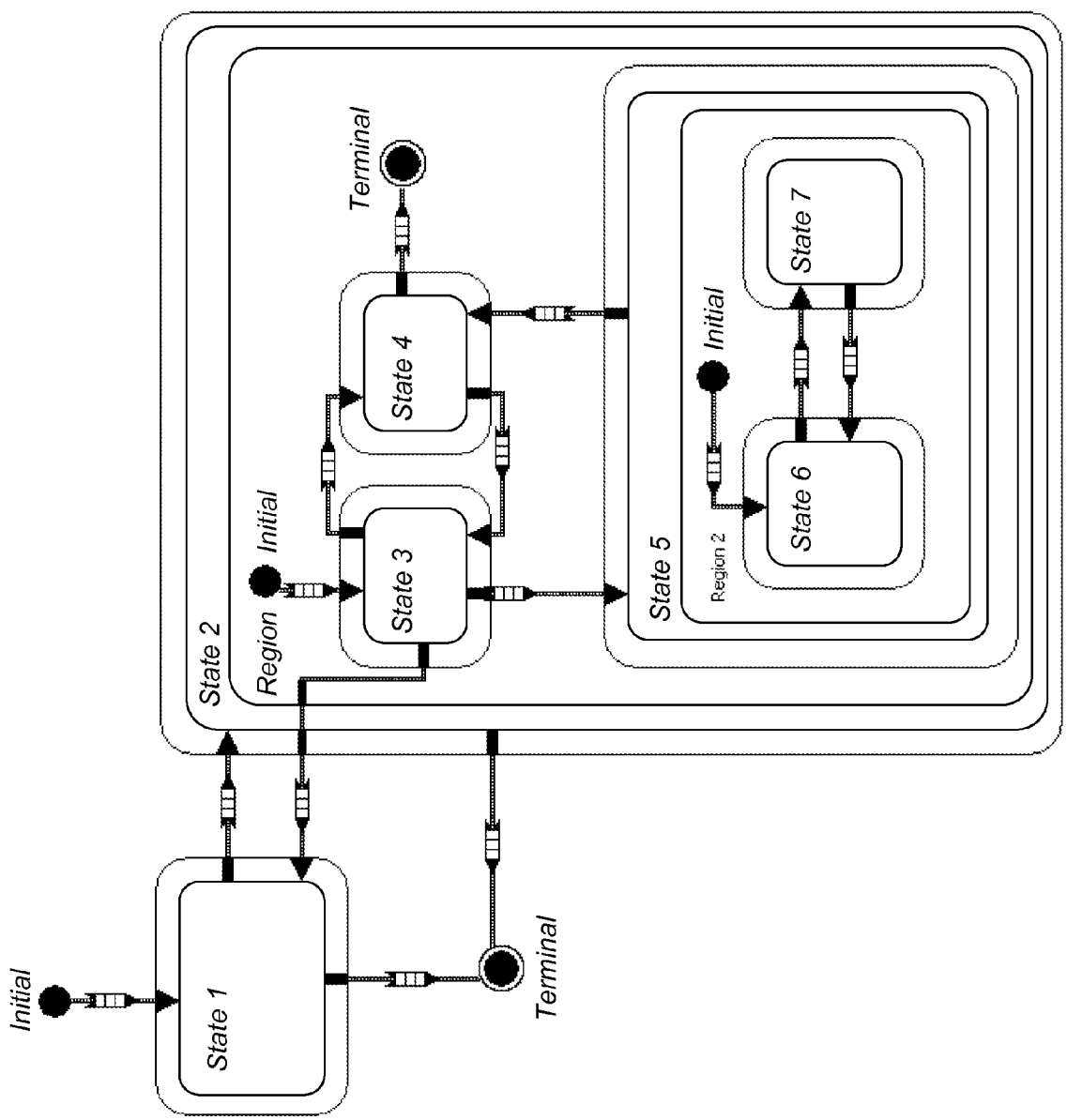

FIGS. 2-3—Exemplary Statecharts

FIG. 2 illustrates one example of a statechart. The statechart may be created by a user via a graphical interface or in any of various ways according to various embodiments; for example, the statechart may be automatically generated, e.g., based on a textual description, an image, a different type of data structure, etc. In this example the statechart has two states, State A and State B, represented by respective state icons. The statechart is configured to transition between State A and State B until a stop trigger is received.

FIG. 3 illustrates another example of a statechart, e.g., which a user might create, or which might be created in any of various ways. In this example, the statechart includes two main states, labeled State 1 and State 2. State 2 is a hierarchical state (also referred to as a superstate) that contains the sub-states State 3, State 4, and State 5. State 5 is also a hierarchical state that contains the sub-states State 6 and State 7. Thus, states in a statechart can be nested to various degrees as desired by the user for a particular application.

Figure 4:
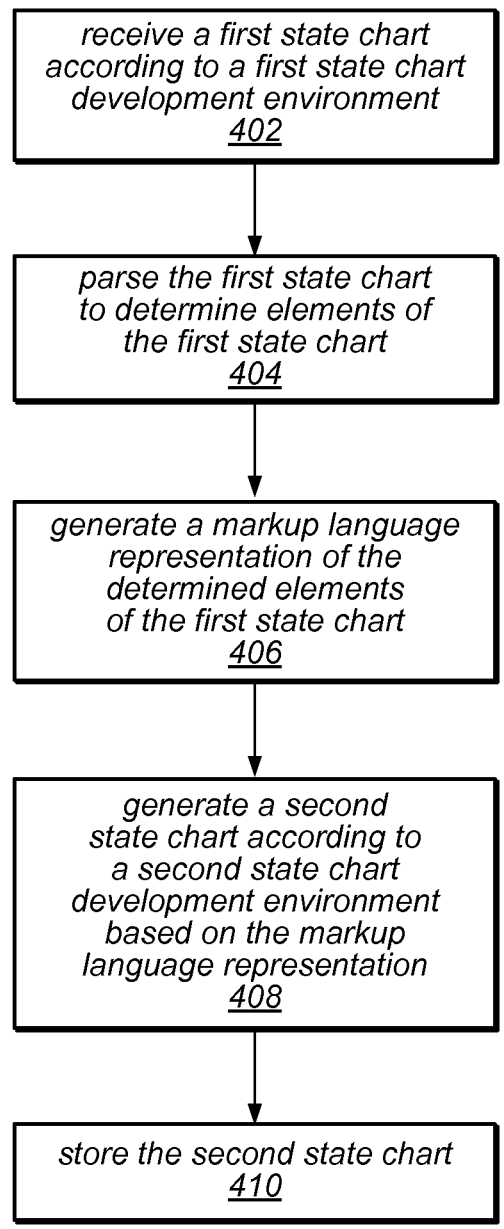
FIG. 4 is a flowchart diagram illustrating one embodiment of a method for converting a statechart from a first statechart format to a second statechart format according to one embodiment.
Figure 5A:
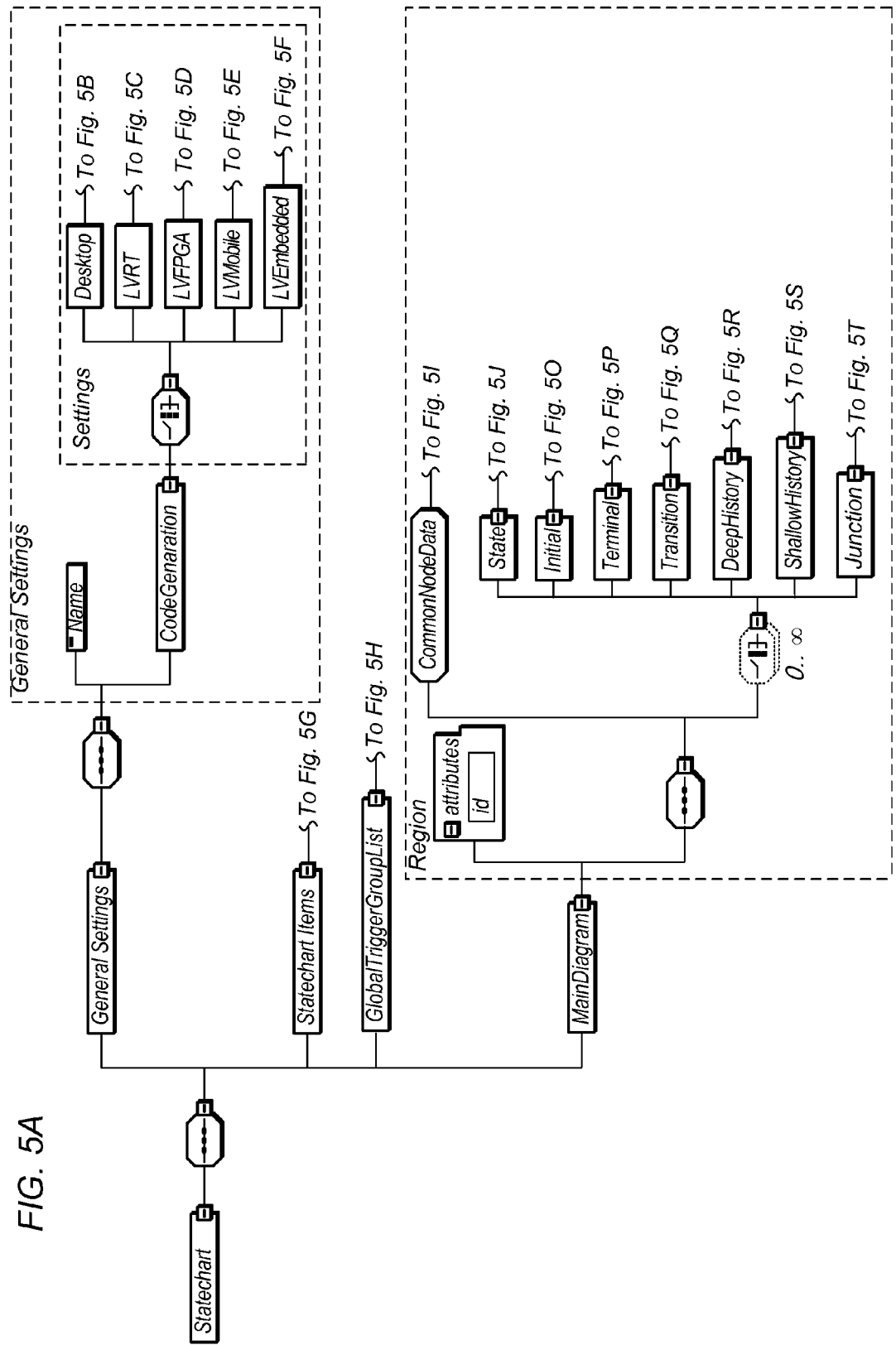
FIG. 5 illustrates a graphical representation of an exemplary XML schema that could be used to represent a statechart according to one embodiment.
Figure 5B:
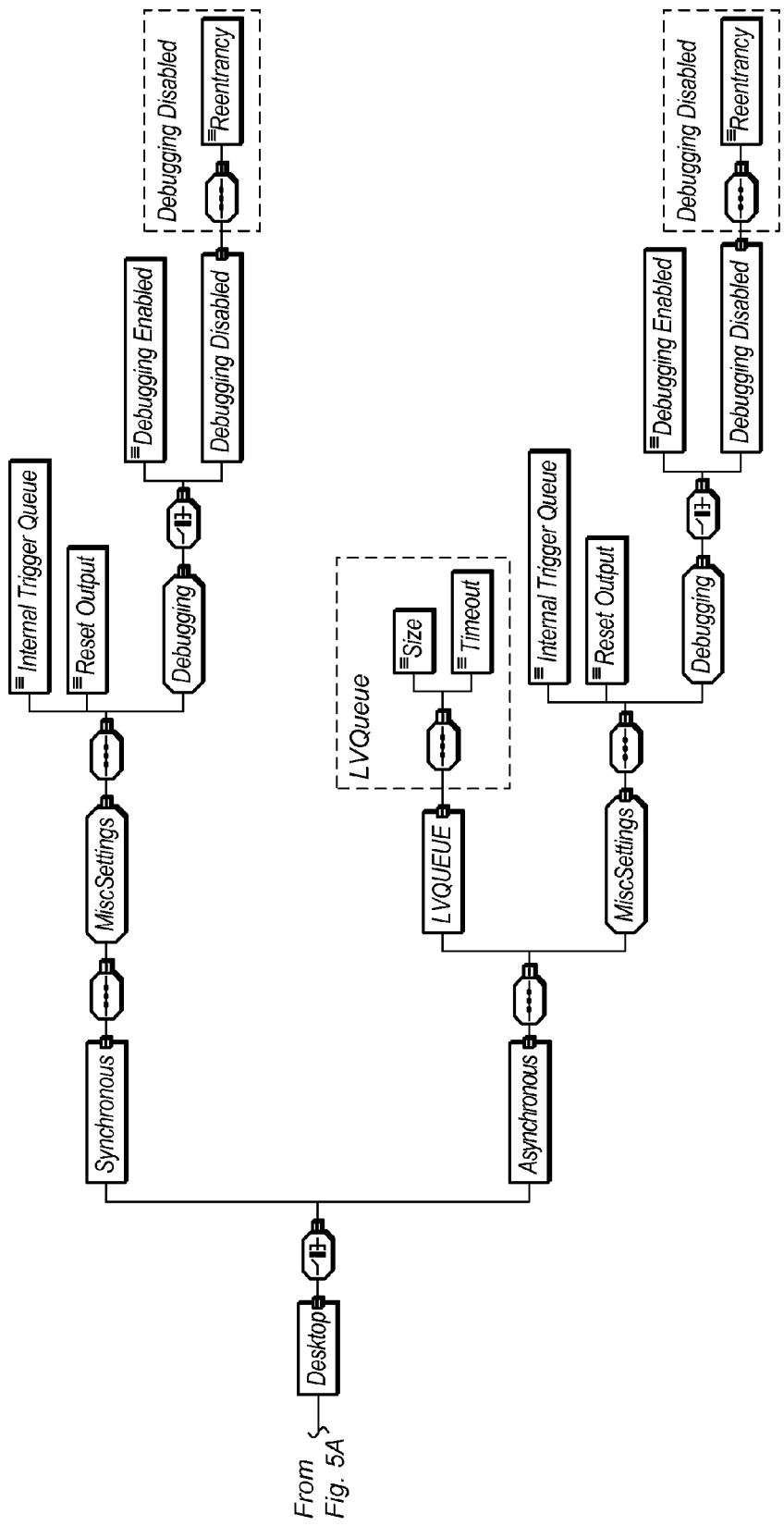
Figure 5C:
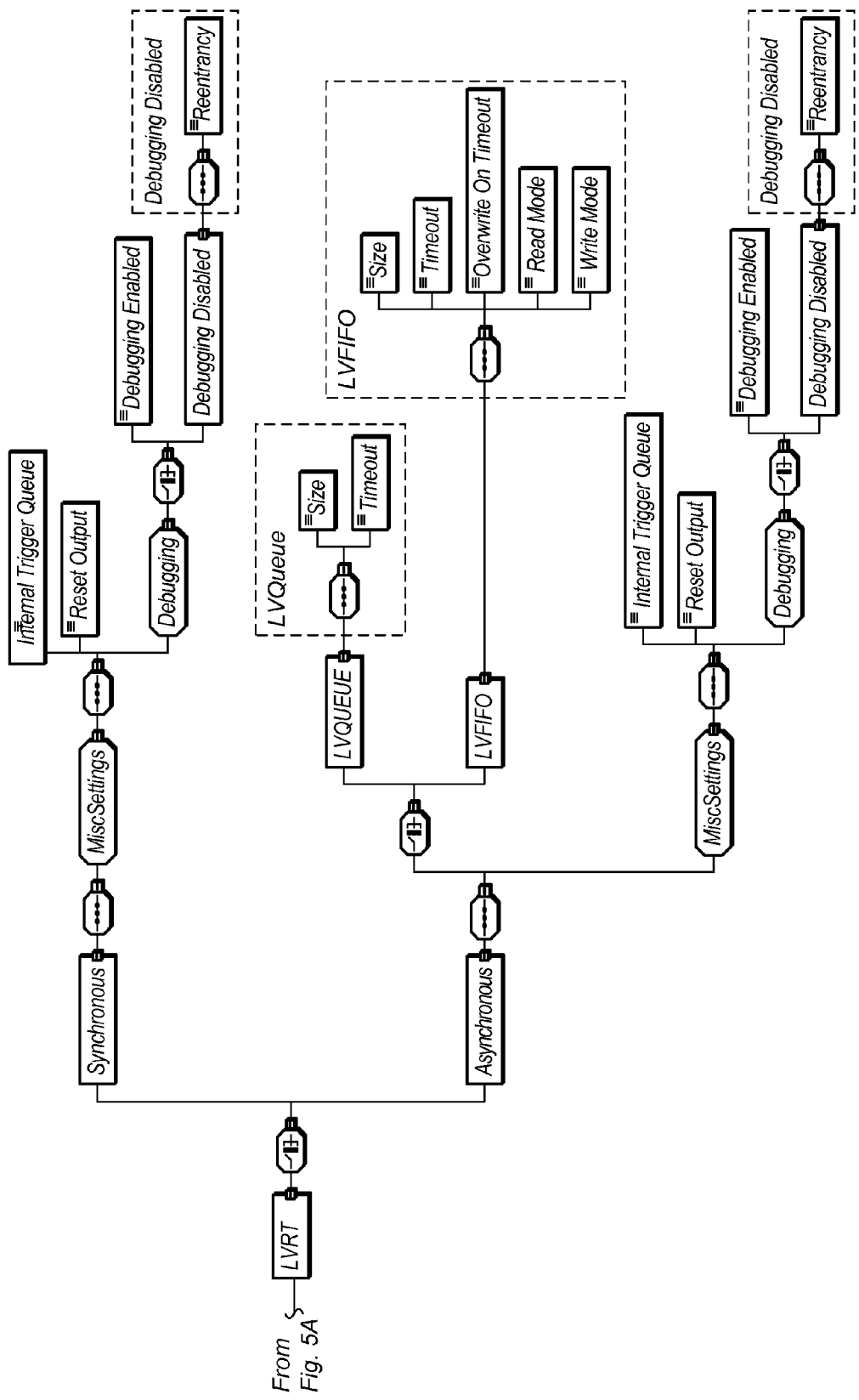
Figures 5D, 5E, 5F:
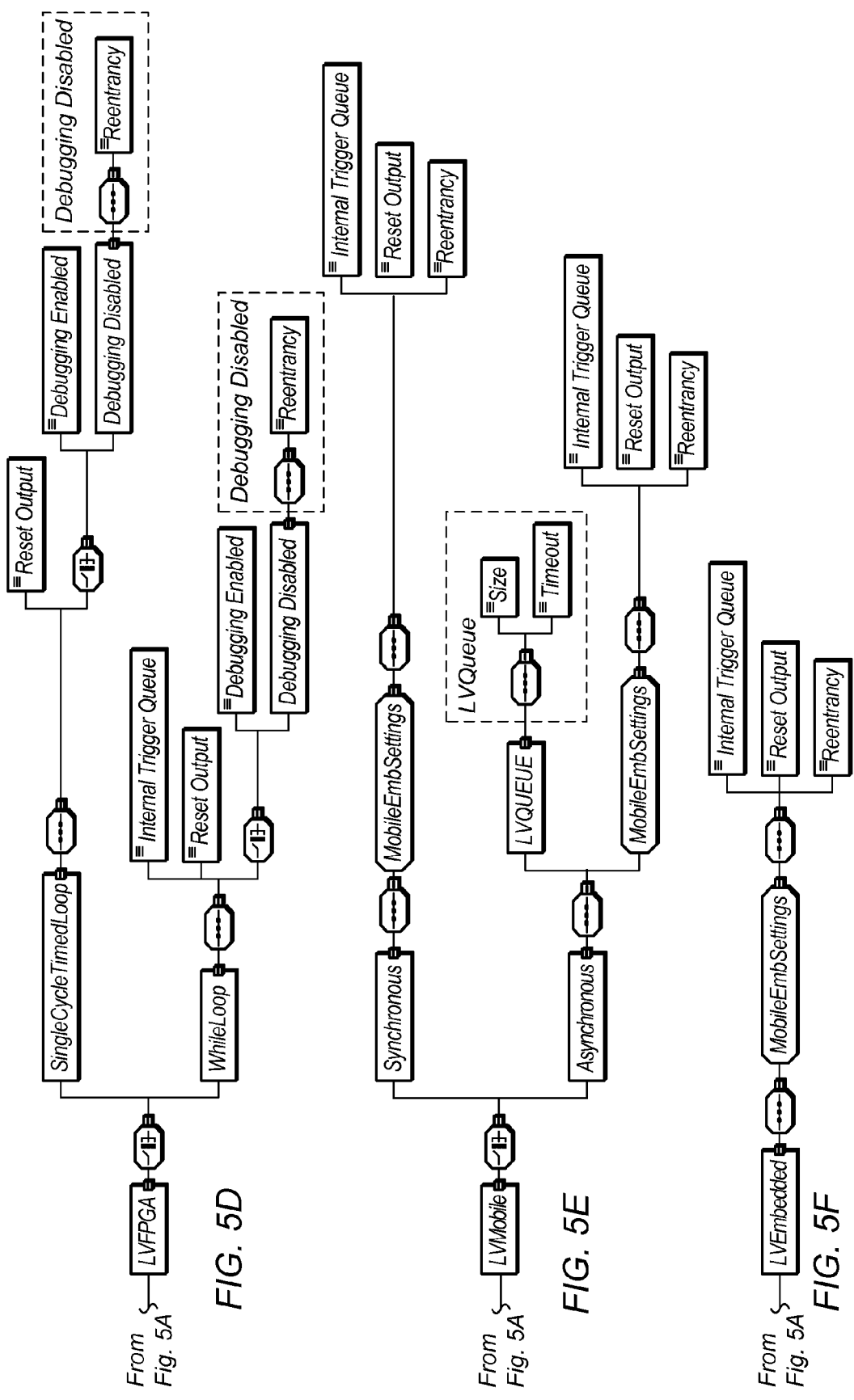
Figure 5G:
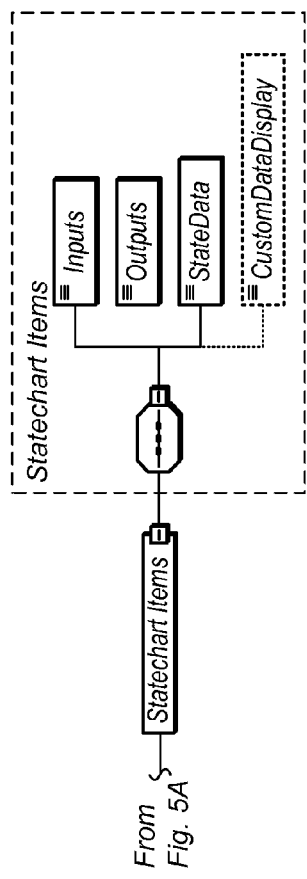
Figure 5H:
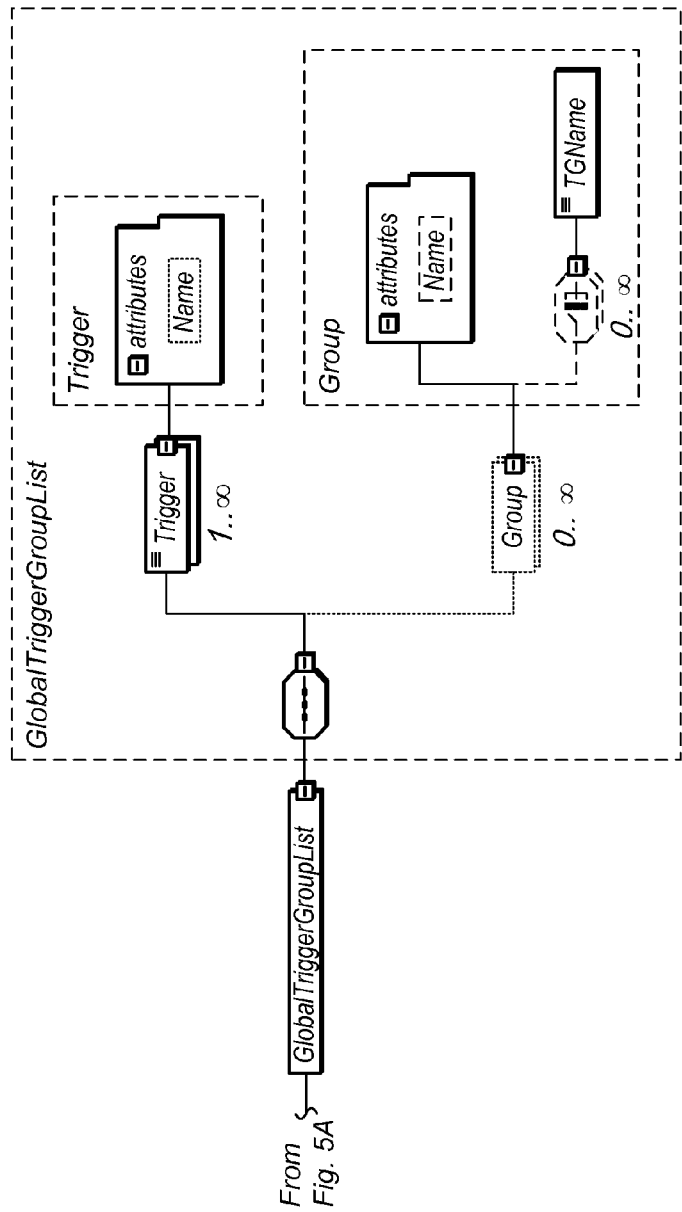
Figure 5I:
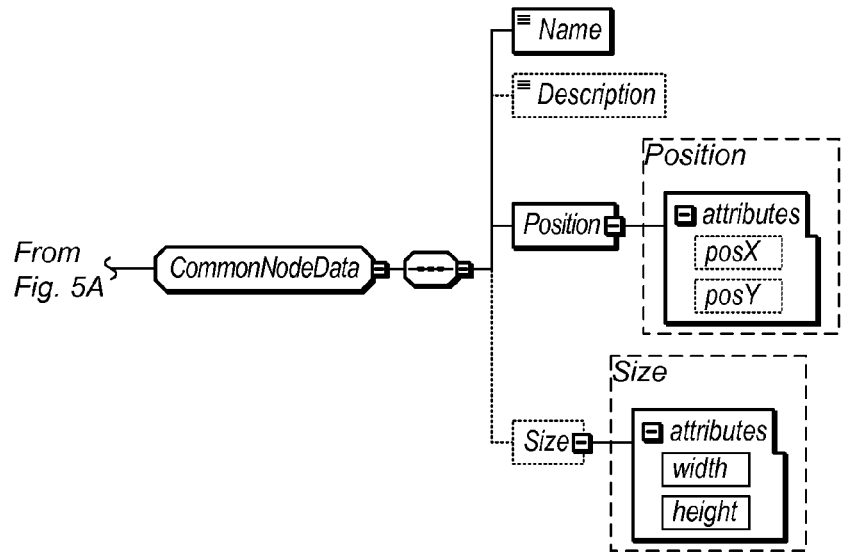
Figure 5J:
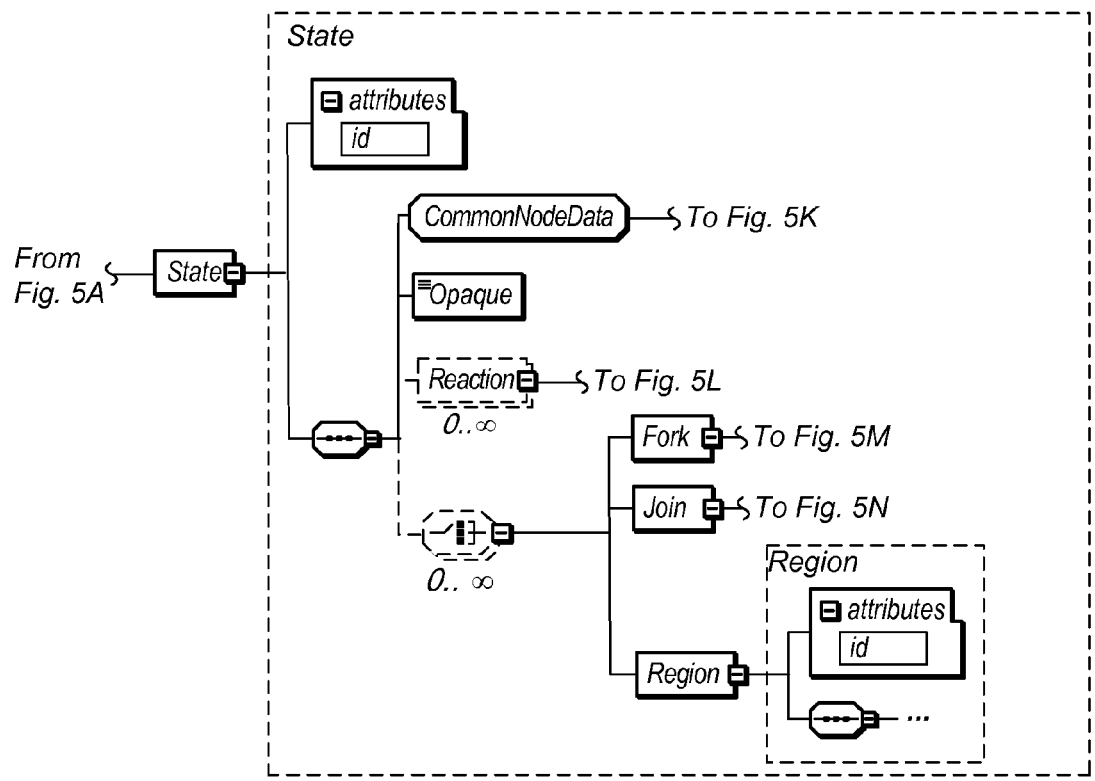
Figure 5K:
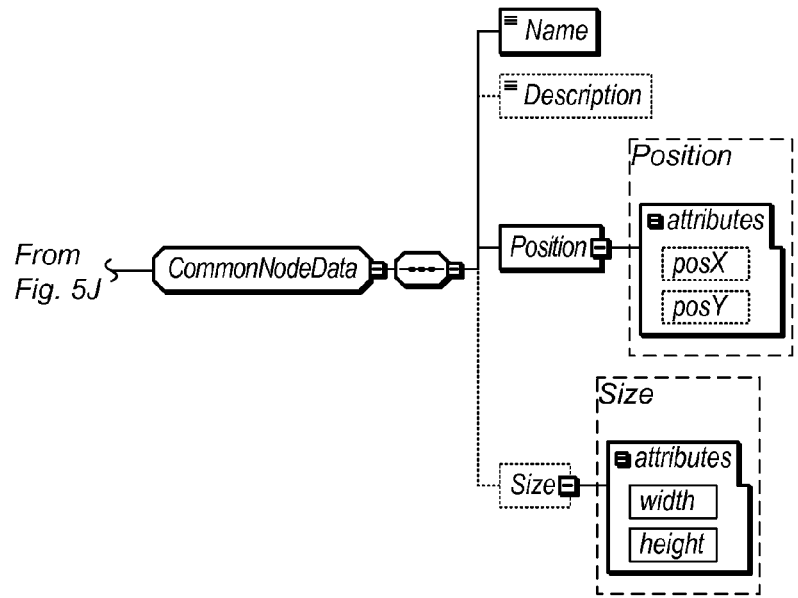
Figure 5L:
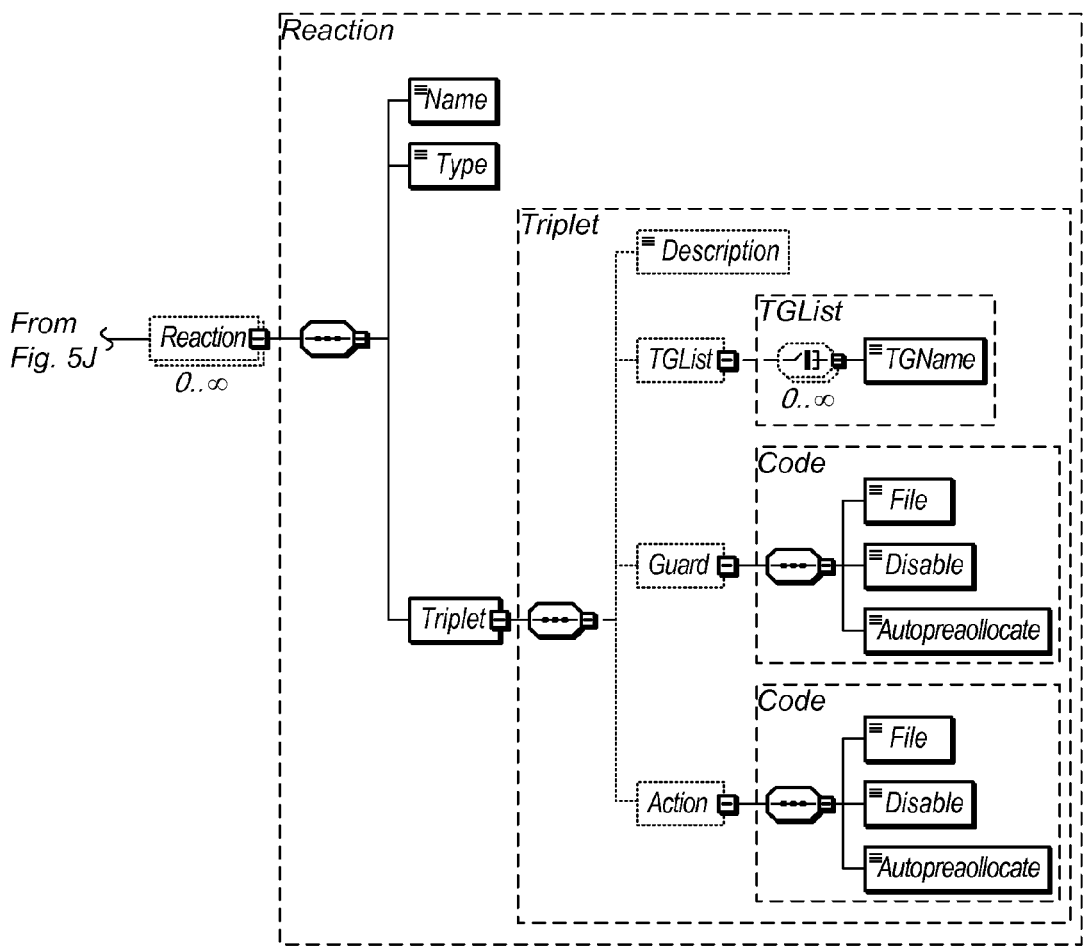
Figure 5M:
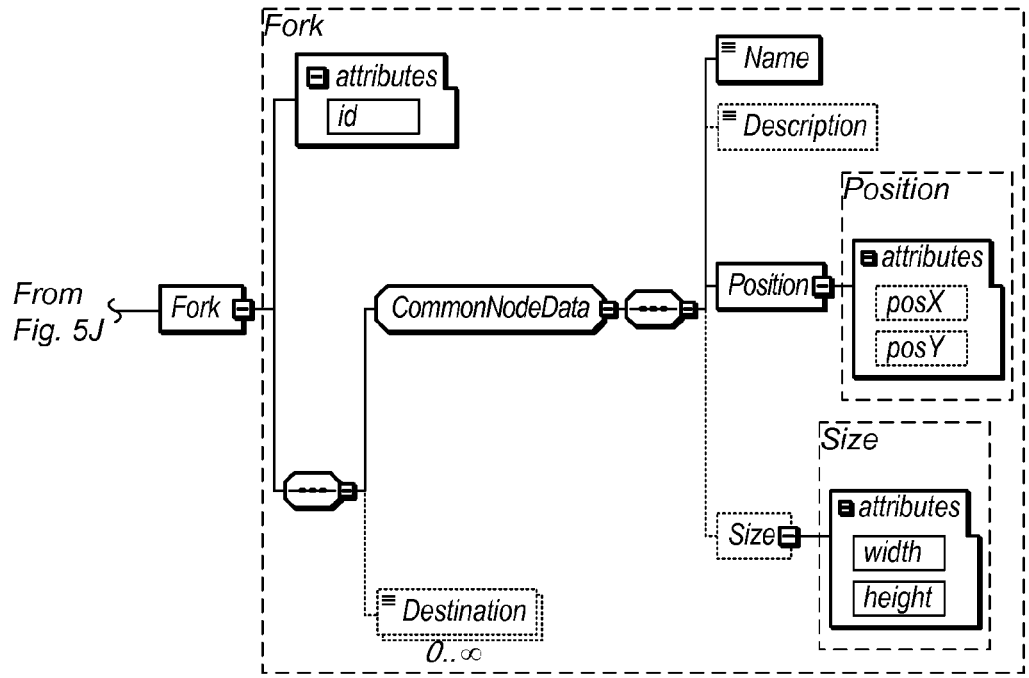
Figure 5N:
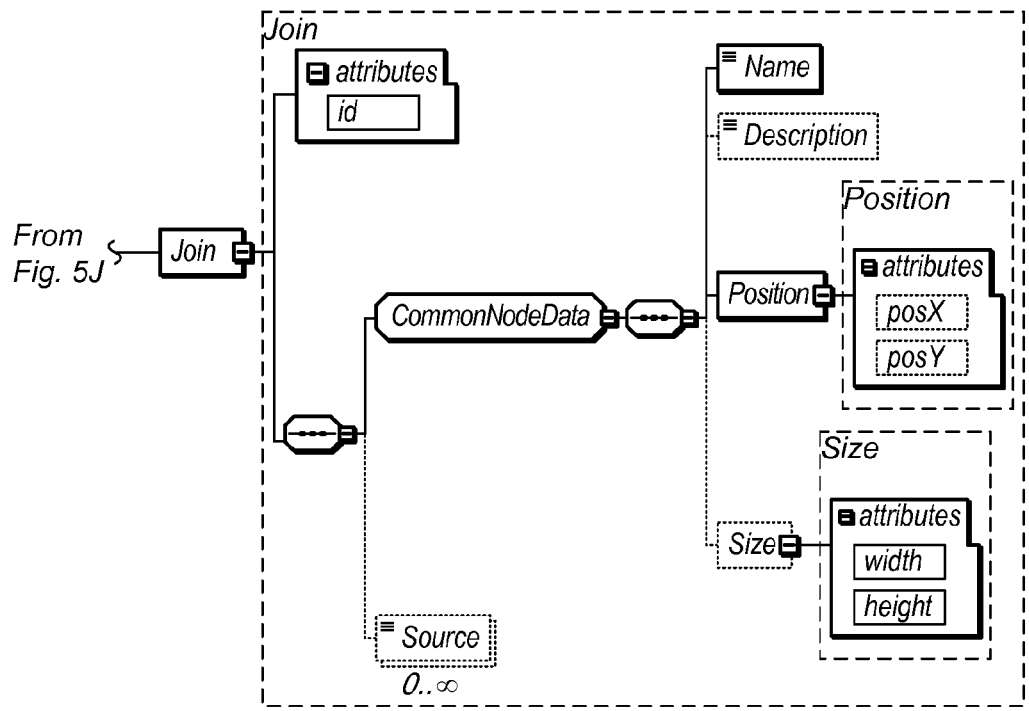
Figure 5O:
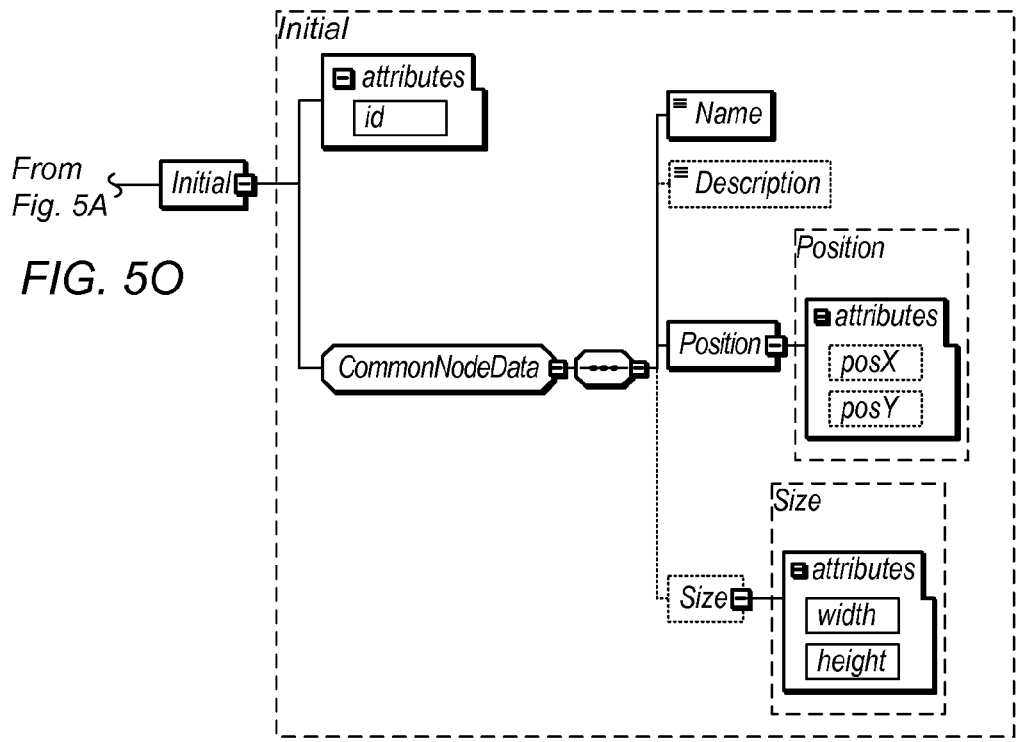
Figure 5P:
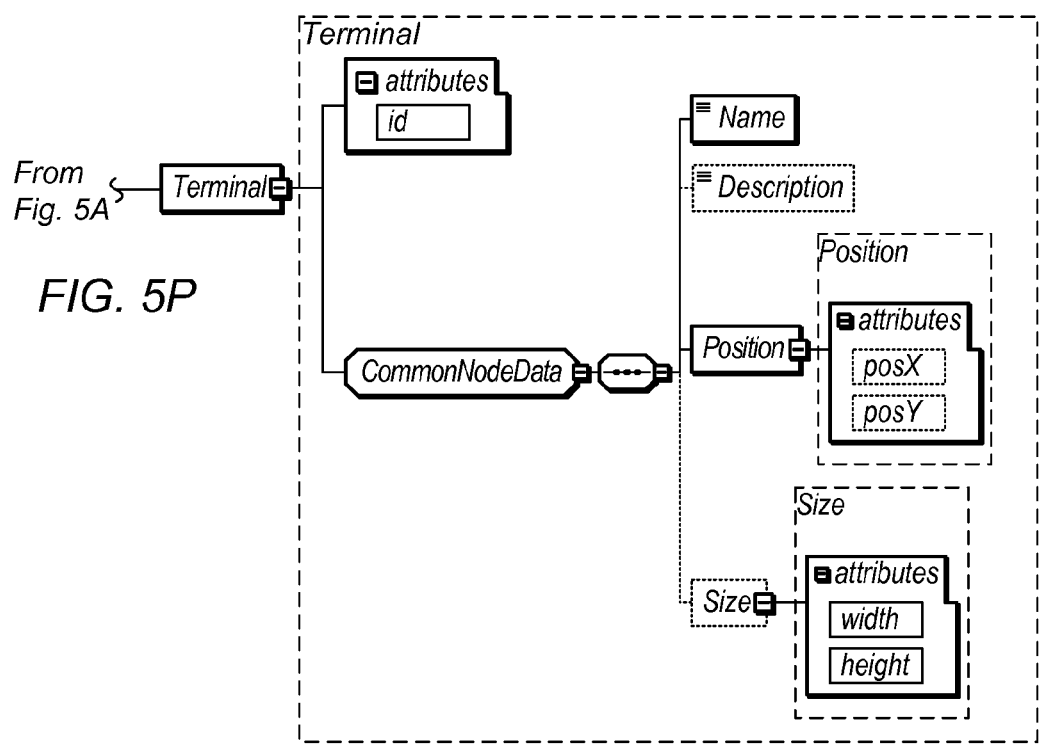
Figure 5Q:
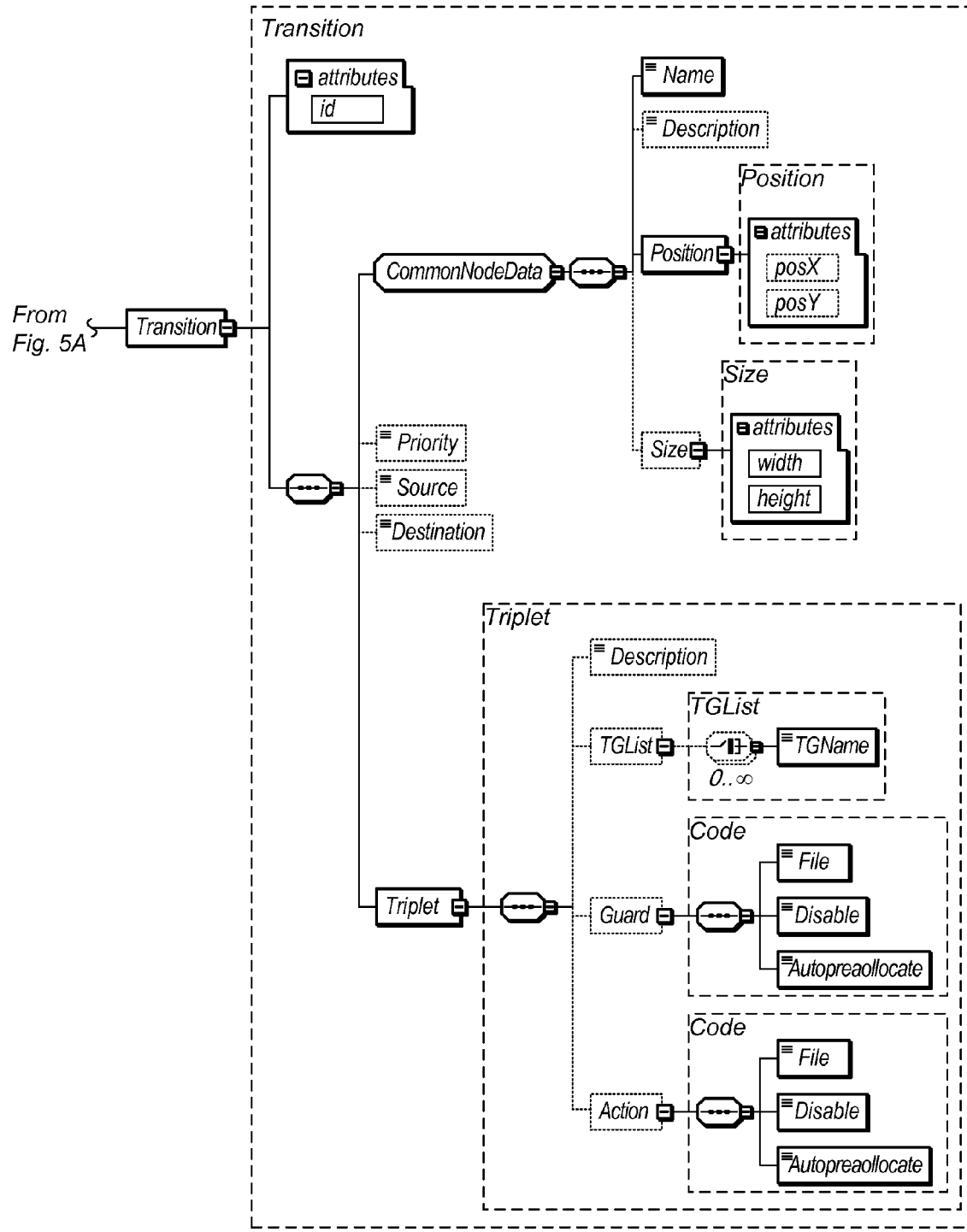
Figure 5R:
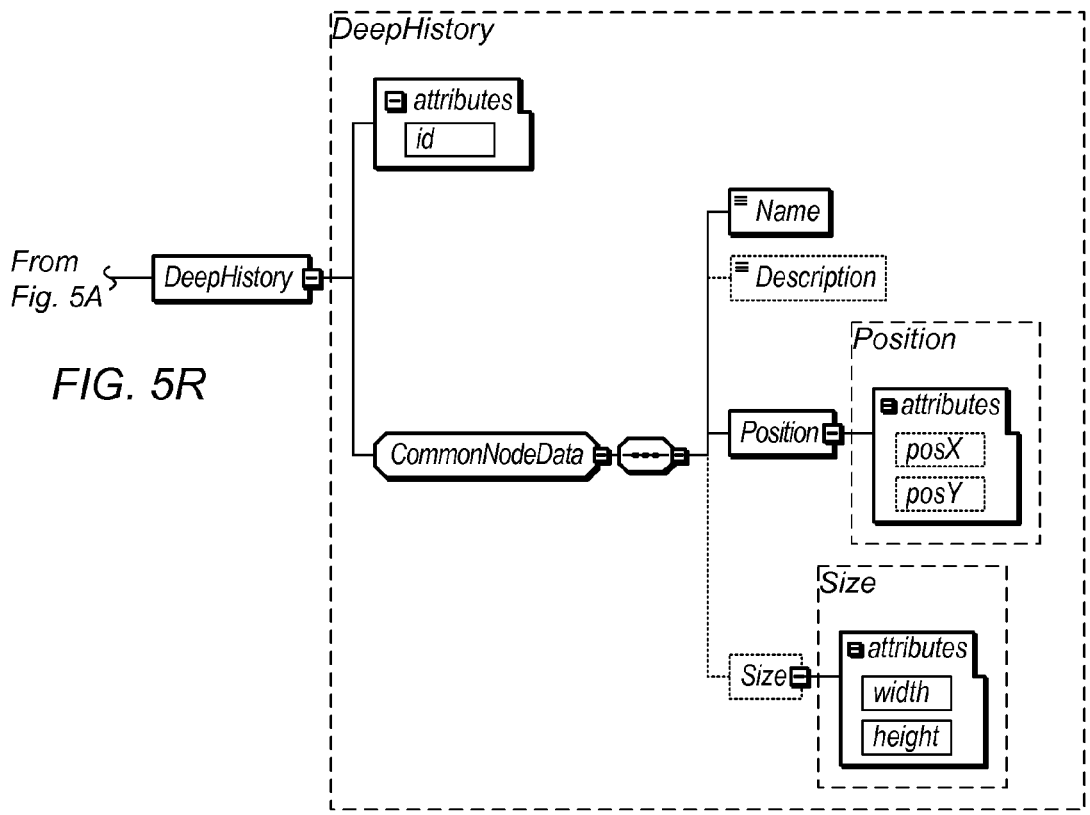
Figure 5S:
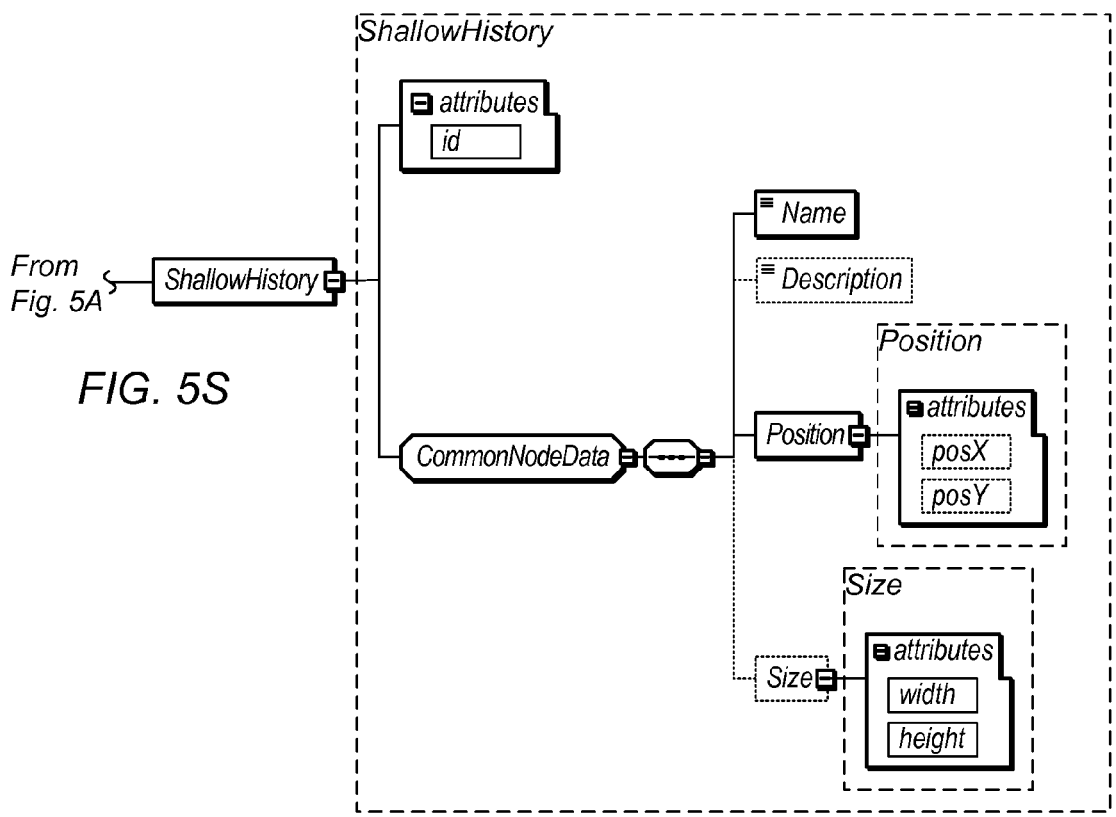
Figure 5T:
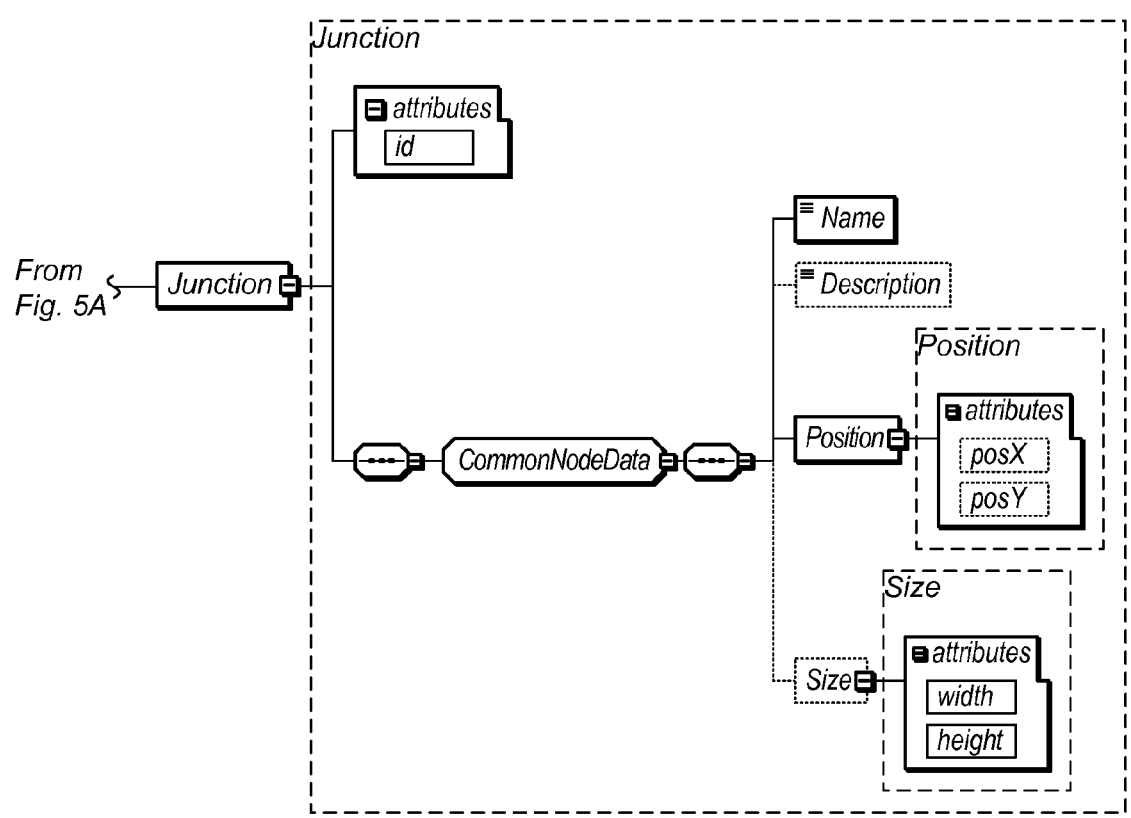

FIG. 4—Method for Converting a Statechart from a First Statechart Development Environment to a Second Statechart Development Environment FIG. 4 is a flowchart diagram illustrating a method for converting a statechart from a first statechart development environment to a second statechart development environment. The method shown in FIG. 4 may be used in conjunction with a computer system 82 such as shown in and described with respect to FIG. 1, or any of various other systems. In various embodiments, some of the method elements shown may be performed concurrently, in a different order than shown, or may be omitted. Additional method elements may also be performed as desired. As shown, this method may operate as follows.

In 402, a first statechart may be received, e.g., may be stored in memory. The first statechart may be in a first statechart format. The first statechart may have been created in a first statechart development environment. The first statechart may implement a first functionality. The first statechart may include a plurality of elements. For example, the first statechart may include a plurality of state icons and a plurality of connector elements (e.g., wires) interconnecting the state icons. The state icons may represent a plurality of states, while the connector elements represent transitions between the states.

In some embodiments, the plurality of elements may include various other elements in addition to the state icons and connector elements. For example, the statechart may include one or more data controls, guards, or actions, or, depending on the statechart development environment, one or more triggers, groups, graphical functions, or other elements. In some embodiments, some or all of these elements may be specified in a textual language.

In 404, the first statechart may be parsed. Parsing the first statechart may include determining the plurality of elements of the first statechart, and in some embodiments may also include determining relationships between the plurality of elements of the first statechart.

In 406, a markup language representation of the determined elements (e.g., including the determined relationships between the determined elements) of the first statechart may be generated, e.g., based on having parsed the first statechart. In some embodiments, the markup language representation may be generated according to a markup language schema (e.g., a schema defined to represent possible elements of a statechart). In some embodiments, the markup language representation may be an eXtensible Markup Language (XML) representation. Other markup language representations (e.g., utilizing other markup languages) are also contemplated.

In some embodiments, e.g., if the first statechart includes data control, guard, and/or action elements specified in a textual language, one or more graphical data flow diagrams may be generated. The one or more graphical data flow diagrams may specify the control, guard, and/or action elements specified in the textual language of the first statechart. In one embodiment, the markup language representation created in 406 based on the first statechart may in fact be closer in format (or representation) to the second statechart format (e.g., closer in format to the second statechart format than the first statechart format).

In 408, a second statechart may be generated based on the markup language representation. The second statechart may be for use in a second statechart development environment. The second statechart may also implement the first functionality. In other words, the second statechart may be functionally equivalent to the first statechart, but may simply be formatted for use in the second statechart development environment. In some embodiments, in generating the second statechart, the one or more graphical data flow diagrams specifying the one or more data controls, guards, or actions may also be included in the second statechart.

In some embodiments, generating the second statechart based on the markup language representation may be performed by an application programming interface (API). The API may determine whether the markup language representation is valid, e.g., according to a markup language schema. The API may also determine whether the first statechart represented by the markup language representation is a valid statechart. In some embodiments, the API may only generate the second statechart if the API determines that the markup language representation is valid and that the first statechart is a valid statechart. If the markup language representation is not valid according to the markup language schema or the first statechart is not a valid statechart, the API may generate an error message (e.g., informing a user that the markup language representation is not valid and/or the first statechart is not a valid statechart). Alternatively, in some embodiments, the API may make a "best effort" to generate the second statechart even if the markup language representation is not valid according to the markup language schema or the first statechart is not a valid statechart. In some embodiments, the API may be a graphical data flow API.

In 410, the second statechart may be stored, e.g., in a memory of a computer system, such as a computer system on which the method that generated the second statechart was performed, or a different computer system. In some embodiments, the second statechart may also or alternatively be displayed upon being generated, e.g., on a display device of a computer system. In some embodiments, the second statechart may then be modified or otherwise manipulated (e.g., using the second statechart development environment) by a user as desired. It is noted that the second statechart may be stored in 410 as part of the generation that occurs in 408.

The parsing of the first statechart in 404 and the generation of the markup language representation in 406 may be performed by software execution, i.e., automatically. In other words, the parsing of the first statechart in 404 and the generation of the markup language representation in 406 may be performed by software without requiring any user input or interaction to accomplish these steps. In addition, if applicable, the graphical data flow diagram(s) may be generated automatically by software based on the data control, guard, and/or action elements that are determined (by software) to be present in the first statechart. In other words, the graphical data flow program(s) may be generated by software, without user input required to create or assemble the graphical data flow program(s). Further, the generation of the second statechart in 408 and storaged of the second statechart in 410 may be performed automatically, i.e., by software without user input required. Thus the generation of the second statechart in 408 may be performed automatically by software, without the user having to manually specify what states, connections, guards, actions, etc. that are present in the second statechart.

Therefore, as noted above, according to some embodiments, part or all of the method may be performed automatically by the computer system. In other words, some or all of the steps may be performed without user input explicitly specifying those steps. For example, in some embodiments, user input may be received requesting that the first statechart be converted from the first statechart development environment to the second statechart development environment, and based on this, program instructions may be executed by the computer system to automatically receive the first statechart, parse the first statechart, generate the markup language representation of the first statechart, generate any graphical data flow diagrams specifying data controls, guards, and/or actions of the first statechart, and/or generate the second statechart, as described above according to any of various embodiments, without any further user input. Other embodiments, including differing amounts of user input, are also contemplated.

FIGS. 5-17—Additional Description of an Exemplary Set of Embodiments

As previously noted, various embodiments of the system and method described herein may be used in conjunction with any of a variety of systems, including a variety of different statechart development environments. The following sections provide additional description of one exemplary implementation of a method for converting a statechart from a first statechart development environment (e.g., Stateflow, in the Simulink environment from The MathWorks) to a second statechart development environment (e.g., StateChart, in the LabVIEW environment from National Instruments). However, it will be readily recognized that other implementations may include different features and limitations; accordingly, the features and limitations described with respect to the following exemplary implementation should not be considered limiting to the disclosure as a whole.

Stateflow data may be embedded within MDL (Simulink model) files. Data for every Stateflow chart in an MDL may be contained within a single Stateflow block at the end of the MDL. The Stateflow block is basically a flattened tree, using id numbers to reference children, parents, and siblings. Below is the structure of this block, highlighting only the parts that the converter is interested in:

```
Stateflow {
    machine {
    }
    ...
    chart {
        id
        name
        chartFileNumber
    }
    ...
    state {
        id
        labelString
              position
        treeNode
              type
        decompositon
    }
    ...
    junction {
        id
        position
        linkNode
        type
    }
    ...
    transition {
        id
        labelString
        src {
            id
        }
        dst{
            id
        }
        linkNode
        executionOrder
    }
    ...
    data {
        id
        name
        linkNode
        scope
        dataType
    }
    ...
    event {
        id
        name
        linkNode
        scope
        trigger
    }
    ...
    instance {
    }
    ...
    target {
    }
    ...
}
```

The Stateflow block may be parsed by a parser, e.g., part of a "converter" for converting a statechart from Stateflow format to StateChart format (for example, as part of converting an MDL file into a LabVIEW format).

The "machine" object contains basic information like date of creation and checksums, and may not be needed by the parser.

There is one "chart" object for every statechart on the MDL's block diagram. The parser uses the ID parameter to associate the chart with its child elements and the name to calculate the path of the resulting LabVIEW StateChart. In the Simulink portion of the MDL, Stateflow blocks reference a specific chart by its chartFileNumber, so this parameter will be used to lookup the correct LabVIEW StateChart after conversion.

The "state" object naturally represents states in the chart. Each has an ID number and position information. The state's guards and actions are expressed through the labelString property, which unifies both guards and actions into something similar to a C-style switch statement. The treeNode parameter is a 4-tuple, with IDs for the parent object, first child, previous sibling, and next sibling, with 0 representing a null reference. There is no distinction between regions and states as there is in LabVIEW StateChart; instead, states are configured as parallel or exclusive, depending on how they are to execute their child states. The type parameter determines whether the state is parallel or exclusive, and the decomposition parameter determines the type of all the state's child states. All children of the same parent are guaranteed to have the same type.

The "junction" object represents connective junctions and history junctions. Each has an ID number and position information. The linkNode parameter is a 3-tuple, with IDs for the parent object, previous sibling, and next sibling, with 0 representing a null reference. The type parameter tells us whether this is a history junction or a connective junction.

The "transition" object represents transitions between states. Each has an ID number. The transition's guards and actions are expressed through the labelString property, which unifies both guards and actions into one line of text. It has 4 sections: one for event logic, one for other guard logic, one for an immediate execution, and one for execution if the transition is actually taken. It has a source ID number (unless it is a default or initial transition, in which case the source ID is missing), and a destination ID number, representing the source and destination states, respectively. The linkNode parameter is the same as described above. The executionOrder determines the order in which multiple transitions from a single state are evaluated.

The "data" object represents an input, an output, or a piece of state data. Each has an ID number and a name. The linkNode parameter is the same as described above. The scope parameter determines whether this is an input, output, or whether it is internal state data. The datatype parameter determines what kind of values this data will have.

The "event" object represents an external trigger for the statechart. Each has an ID number and a name. The linkNode parameter is the same as described above. The scope parameter determines whether this is an input, output, or function call event. (The Converter will only support input events for now.) The trigger parameter determines how this event is triggered. A rising edge event is triggered when the input signal moves from a negative value to a nonnegative value. A falling edge event is triggered when the input signal moves from a nonnegative value to a negative value. An either edge event occurs when either a rising or falling edge event occurs. An event with no trigger will never occur.

The "instance" object provides linkage between machine objects and chart objects. It may not needed by the parser.

The "target" object provides The MathWorks-specific code generation information for each machine, and may not needed by the parser.

The parser may extract all the necessary parameters from the MDL file and organize them in corresponding LabVIEW objects. These objects may have methods that will allow them to create their own markup language representation (e.g., XML) and whatever graphical data flow diagrams ("subVIs") are needed.

A final step in the parsing process may include assigning every object to its parent object. In the Stateflow tree structure, a parent object (a chart or a state) is only aware of its first child of each type. This step would make a parent aware of all of its children, enabling use of simple top-down recursion to create all XML and all subVIs.

After parsing is finished, the converter will create an XML file for each chart object. FIG. 5 is a visual representation of an exemplary XML schema which could be used to represent a statechart. The actual exemplary XML schema represented by FIG. 5 is also included as an appendix. The converter will iterate over all charts, and each chart will call its child objects' XML creation methods. States may also have children, so the XML creation process is recursive for states. Data and Event objects may not need to create any XML; they may be handled in the next step, where data controls, guard, action, and graphical function VIs are created. However, the paths to the appropriate controls are calculated here as well.

The XML for junctions and transitions is fairly simple and straightforward. Junctions contain an ID and positioning information. Transitions contain an ID, positioning information, IDs for source and destination objects, and paths for their guard and action data flow diagrams ("VIs").

The XML for states may be a little more complicated, because of the different roles that regions and states play in LabVIEW StateChart and in Stateflow. In LabVIEW StateChart, a state may not be able to directly contain anything other than a region. A region may be able to contain anything except another region. In Stateflow, there may not be such a concept as a region, but states may be able to directly contain any object. Thus, extra objects would need to be created, while maintaining the integrity of the ID numbers so that transition sources and destinations are preserved. The XML for a state may thus contain an ID, positioning information, lists of guards and actions, and XML for any child regions. The XML for a region may thus contain an ID, positioning information, and XML for any child states, transitions, or junctions. Given this situation, there may be six cases that should be considered in order to create XML that is semantically equivalent to a Stateflow state which the XML is to represent:

The first case includes an OR (exclusive) state with no child objects. In this case, a state will be created, and will receive the ID of the original state object, as well as any guards or actions.

The second case includes an AND (parallel) state with no child objects. In this case, a region will be created, and inside the region will be an initial pseudostate with a transition to a state. This state will receive the ID of the original state object, as well as any guards or actions.

The third case includes an OR (exclusive) state with AND (parallel) child states. In this case, a state will be created, and will receive the ID of the original state object, as well as any guards or actions.

The fourth case includes an AND (parallel) state with OR (exclusive) child states. In this case, a region will be created, and inside the region will be an initial pseudostate with a transition to a state. This state will receive the ID of the original state object, as well as any guards or actions. Another region will be created inside this state, which will contain any child objects.

The fifth case includes an OR (exclusive) state with OR (exclusive) child states. In this case, a state will be created, and will receive the ID of the original state object, as well as any guards or actions. A region will be created inside this state, which will contain any child objects.

The sixth case includes an AND (parallel) state with AND (parallel) child states. In this case, a region will be created, and inside the region will be an initial pseudostate with a transition to a state. This state will receive the ID of the original state object, as well as any guards or actions, and will contain any child objects.

Data flow diagrams (e.g., LabVIEW "virtual instruments" or "VIs") may also need to be created for data controls, guards, actions, and graphical functions.

Data controls may be relatively simple to create. Each chart will have its own Inputs, Outputs, and StateData controls, which will be created from their Data and Event child objects. The Inputs control will be a cluster with elements created using all Data objects marked as inputs, and will also have a boolean for each Event object. The Outputs control will be a cluster with elements create using all Data objects marked as outputs. The StateData control will consist of all other Data objects not marked as inputs or outputs.

Guard and action VIs may need to be created from their labelString parameter, which may be written using the textual Stateflow action language. This language has syntax similar to that of MathScript, but may not have any control flow. Every action VI will have three inputs—the Inputs, Outputs, and StateData controls—and two outputs—the Outputs and StateData controls. Every guard VI will have the same three inputs, and a boolean output which determines if the corresponding action should execute. Syntax for the two types of guards and actions is slightly different, so the two must be considered separately.

State labels may essentially be a big case structure. They may be divided into sections, where each section has a label that determines whether the section should execute or not. The label can indicate that the action should execute on state entry or exit, that the action should occur "during" the state (i.e., an event occurs but no valid transitions are found), or whenever a particular event occurs. Each section consists of a list of assignment operations that use the current values of the inputs, outputs, and state data to generate new values of the outputs and state data. These sections may also make use of graphical functions or built-in functions in their calculations. A guard and action VI may be required for all sections except the entry and exit sections, which may require only the action.

Transition labels may be divided into four sections, each of which may be optional: the event trigger, the condition, the condition action, and the transition action. The event trigger is a boolean expression, either a single event name or a list of event names ORed together. If the event trigger is empty, it is assumed to be TRUE. If the event trigger is true, the condition is evaluated. This is also a boolean expression, but may consist of any number of operations involving all available data. If the condition is empty, it is assumed to be TRUE. If the condition is TRUE, the condition action will be executed immediately. The condition action is a list of assignment operations, much like a section in a state label. After this, the engine moves to the next transition. Once a list of valid transitions (i.e., whose event trigger and condition are both TRUE) is found that leads originates in the current state and that terminates at a state, all of the transition actions in that list may be executed in order. A transition action may be exactly like a condition action, except for the timing of the execution. The event trigger may be combined with the condition action into one guard VI, and the condition action and transition action may be combined into one action VI, as this may be the closest that LabVIEW StateChart can come to the Stateflow semantics previously described.

If a Stateflow chart contains condition actions, the Converter may give a warning using its current error handling mechanism so that the user knows that the semantics of the resulting LabVIEW StateChart may be different than the original Stateflow chart.

In order to script VIs from this action language, a separate parser may divide a label into tokens and generate a parse tree based on the token list. The parse tree may then be given to a recursive algorithm which will maintain a symbol table of symbol names and their corresponding reference numbers ("refnums"), and script a VI from the parse tree using a post-order traversal, ensuring that operator precedence and statement order is preserved.

Stateflow's "graphical functions" may represent a unique challenge. They may be represented as states on the chart diagram, but may be unattached to the rest of the statechart graph by transitions, and function as subroutines, where the assignment operations are carried out through transition actions, and control flow is determined by transition guards and junctions. Essentially, they may function as a finite state machine, which may allow them to be implemented using a while loop with a case structure inside, which may be LabVIEW's version of a finite state machine.

A graphical function may have a label which determines its inputs and outputs. It may take the form [out1, out, . . . , outN]=function_name(in1, in2, . . . , inM), where out1 through outN are the names of the return values and in1 through inM are the names of the function arguments. A subVI created for a graphical function may accordingly have an input for every argument and an output for every return value. It may also have inputs for the Inputs, Outputs, and StateData controls, and outputs for the Outputs and StateData control, as graphical functions may also be able to modify these values.

The block diagram of a graphical function may include a while loop containing a case structure. The current junction ID number may be carried on a shift register, and wired into the control input of the case structure. The function's data may also be carried on shift registers. Each page of that case structure may represent a junction and all transitions leaving that junction. Each page may have a series of nested case structures. The top-most structure represents the transition with the earliest execution order, and so on to the bottom-most case structure, representing the transition with the latest execution order. The control input for each case structure may be a boolean wired to the result of ORing the event trigger and the condition of the transition. The true case may contain the condition action and transition action logic, and may put the ID of the destination junction on the shift register for the next iteration. The false case may contain the logic for the next transition. In the bottom-most transition, entering the false case may terminate the while loop and cause the current values of all the function's data to be returned to the caller.

One alternative to implementing graphical functions as a LabVIEW while loop state machine would be to create another statechart which could be called by the first. However, this approach may be problematical insofar as graphical functions are basically states containing nothing but junctions and transitions, which may not possible in LabVIEW StateChart: it may not be possible to have an initial transition to anything other than a state. In addition, the internals of Lab-VIEW StateChart code generation may be based on the assumption that all transitions eventually lead to either a state or a terminal pseudostate. In graphical functions, these assumptions may not hold, and it is possible that StateChart would require some significant modifications in order to accommodate them. A second concern may be that the overhead of a StateChart based graphical function may be more than a pure G graphical function.

Figure 6:
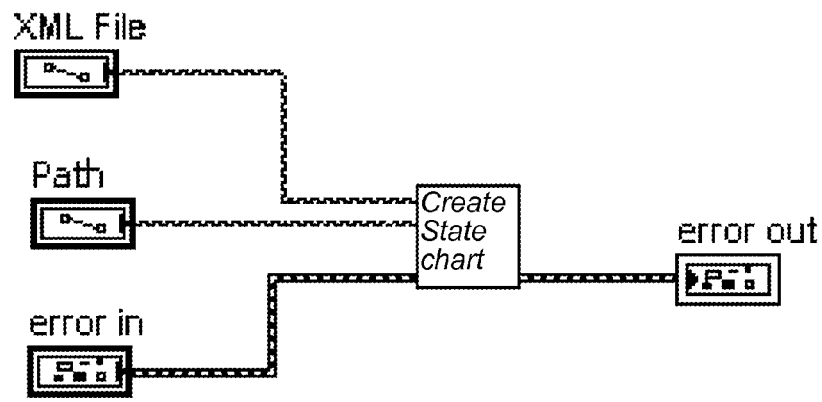
FIG. 6 illustrates an API which could be used to generate a statechart from XML according to one embodiment.

After the XML, data controls, and subVIs have been created, a StateChart API may be called to create the statechart in LabVIEW format. The API may be a graphical data flow API, e.g., a LabVIEW VI. FIG. 6 illustrates an exemplary API for creating a statechart according to one embodiment. In this example, XML file node represents the XML string representing the Statechart (e.g., according to the XML schema shown in FIG. 5). The Path node provides the path where Statechart will be created. The API may parse the XML and create a statechart at given path (assuming the XML is valid) and generate code for the created statechart (assuming the represented statechart is not broken).

The API may also include or call upon one or more other APIs (e.g., VIs) in order to generate the statechart.

Figure 7:
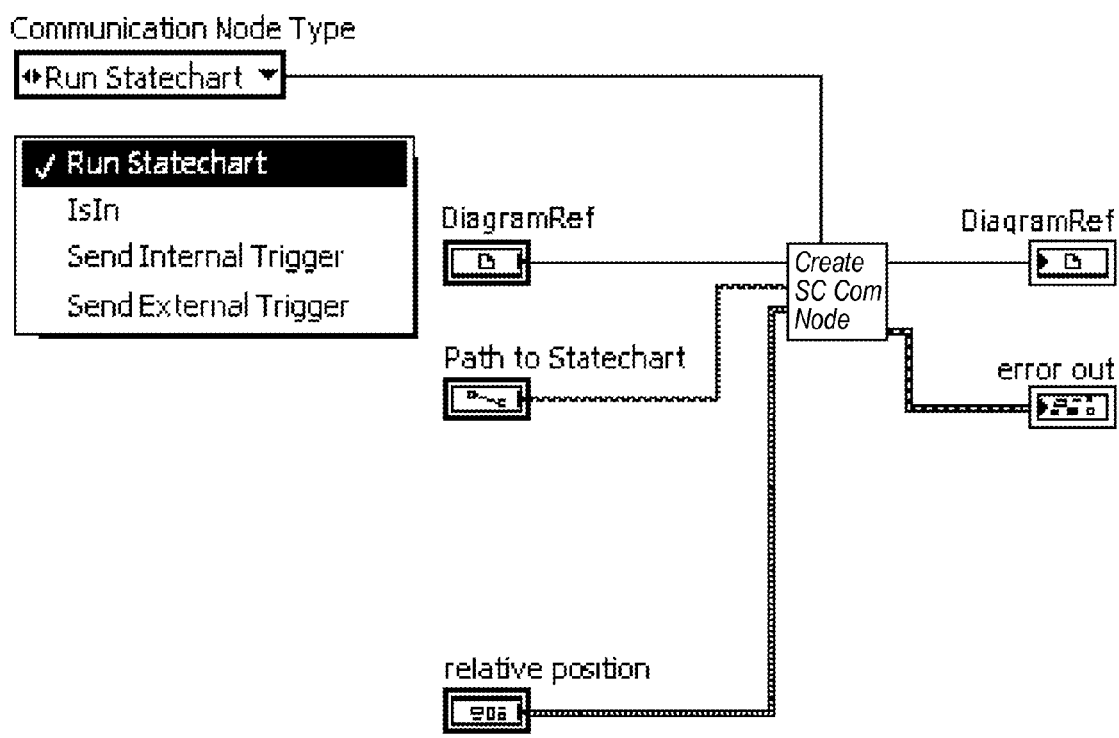
FIG. 7 illustrates an API which could be used to generate statechart communication nodes according to one embodiment.

FIG. 7 illustrates an exemplary graphical data flow API for creating statechart communication nodes. This API may abstract the creation of statechart communication nodes. The API may accept a type of Statechart Communication Node, a Path to Statechart, Owner VI, and position. The API may then create the communication node linked to the given statechart and place it in the owner VI.

Figure 8:
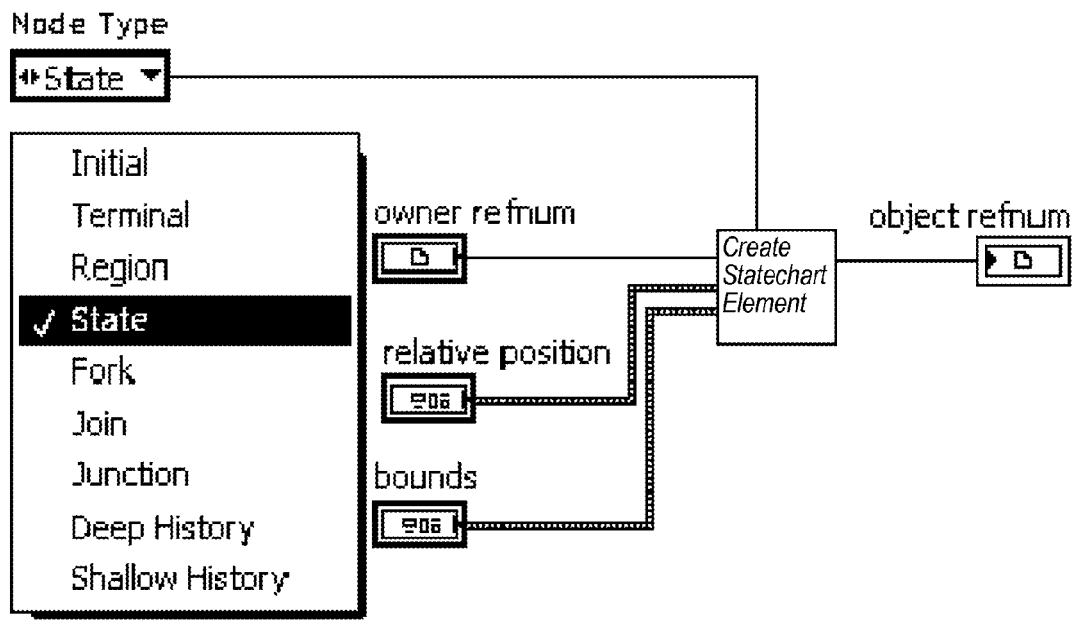
FIG. 8 illustrates an API which could be used to generate statechart elements according to one embodiment.

An API may also be used to abstract the creation of statechart elements. FIG. 8 illustrates an exemplary graphical data flow API which could be used to generate statechart elements according to one embodiment. The exemplary API may accept a type of statechart element, a position of the element, and bounds of the element, as inputs. The API may thus create the statechart element and return a reference number of the created object.

Figure 9:
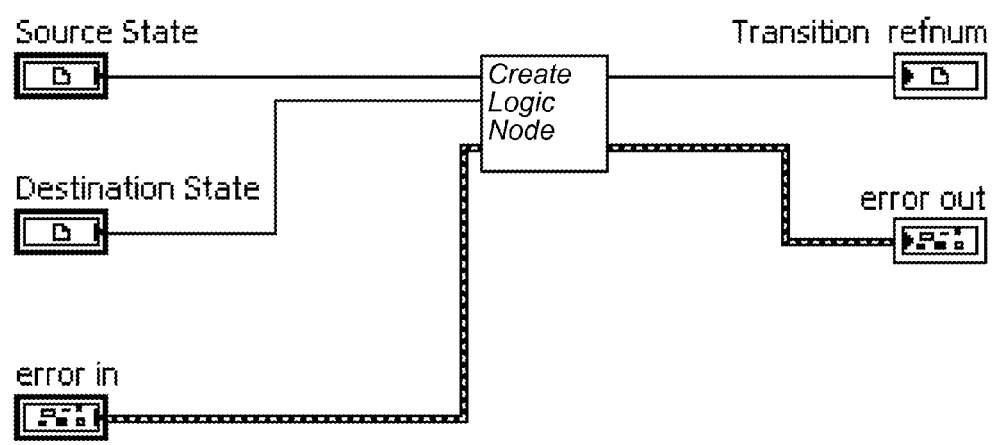
FIG. 9 illustrates an API which could be used to generate transition nodes according to one embodiment.

An API may also be used to create transition nodes. FIG. 9 illustrates an exemplary graphical data flow API which could be used to generate transition nodes according to one embodiment. The exemplary API may accept source and destination states, create the transition between the two states, and return a reference number of the created transition node.

Figure 10:
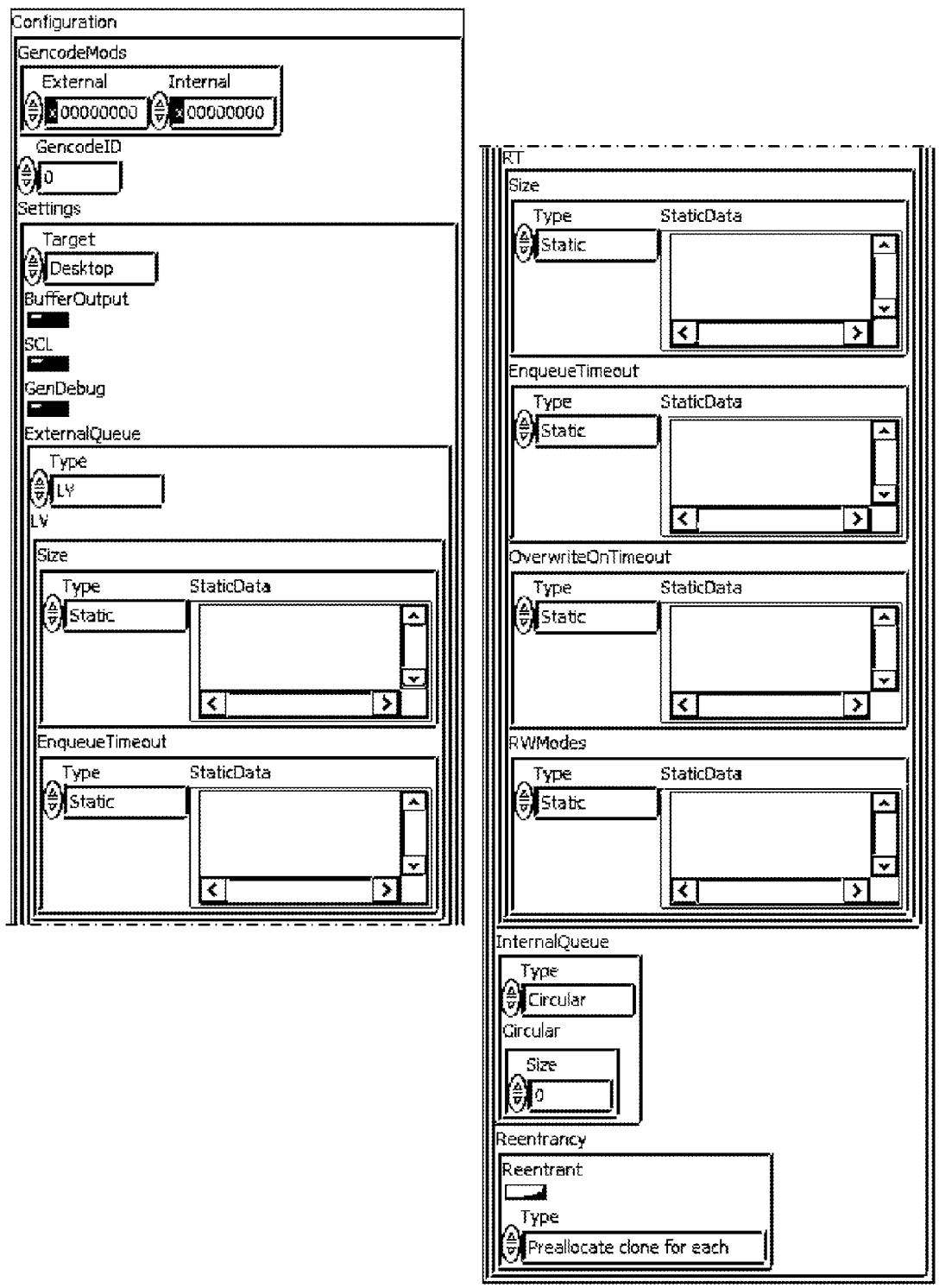
FIG. 10 illustrates a code generation cluster according to one embodiment.
Figure 11:
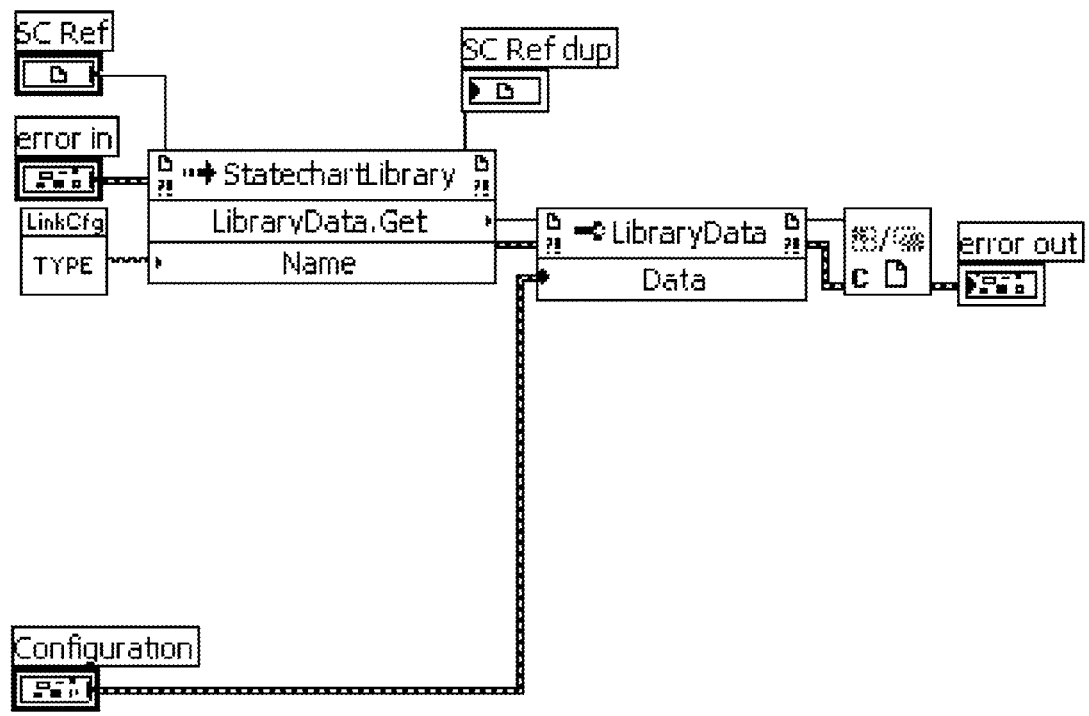
FIG. 11 illustrates an API for setting configuration library data for a statechart according to one embodiment.

The code generation settings in XML may be parsed and converted into a Configuration Cluster such as shown in FIG. 10. An API (such as the LabVIEW VI shown in FIG. 11) may then be used to set configuration library data of the Statechart.

The XML representation of the statechart may include a GlobalTriggerGroupList element. This element may be parsed and converted into a cluster (such as shown in FIG. 12), and an API (such as the LabVIEW VI shown in FIG. 13) may be used to set triggers/groups of the statechart.

Another API may be used to replace existing controls (e.g., .ctl) with user specified controls For example, the API may support StateData.ctl, Inputs.ctl, and Outputs.ctl. An exemplary such API is shown in FIG. 14.

Figure 15:
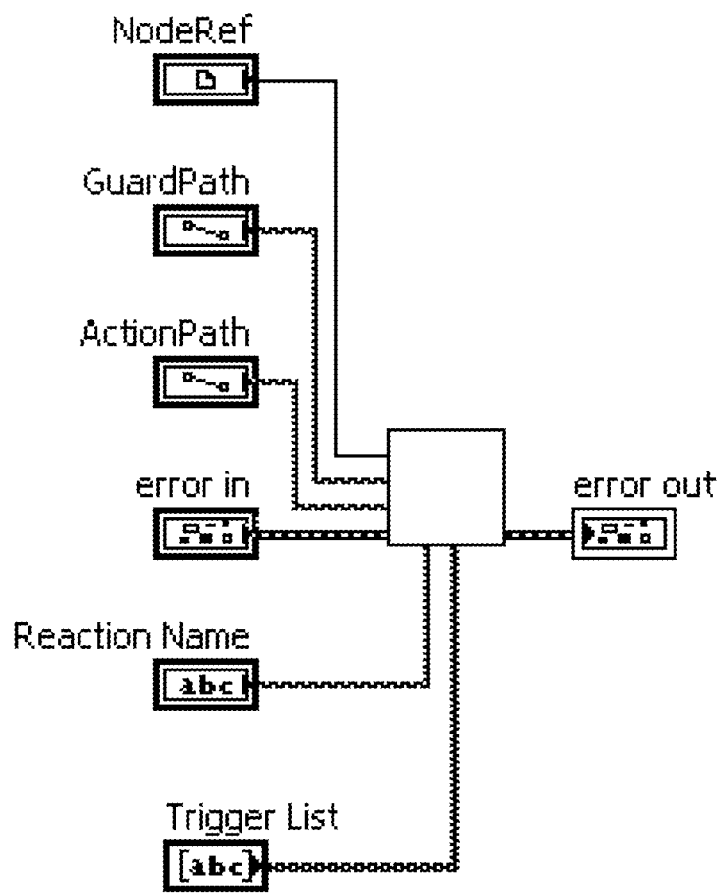
FIG. 15 illustrates an API for creating state and transition reactions for a statechart according to one embodiment.

There may also be an API for creating a reaction (e.g., a guard, action, or trigger list) for a state or a transition. An exemplary such API is shown in FIG. 15. For example, the API may accept as inputs a reference to a corresponding state or transition ("NodeRef"), a path to a guard VI, e.g., if there is a guard for the reaction ("GuardPath"), a path to an action VI, e.g., if there is an action for the reaction ("ActionPath'), an entry, exit or static reaction name ("Reaction Name") which may be ignored for transitions, and a trigger list for a static reaction of a state or transition ("Trigger List").

Figure 16:
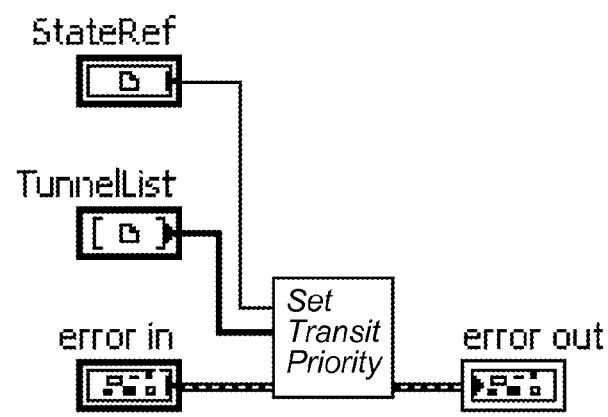
FIG. 16 illustrates an API for setting transition priorities for a statechart according to one embodiment.

An API may also be provided to set transition priorities for a state. An exemplary such API is shown in FIG. 16. The API may accept as inputs a reference to the state and an array of tunnes. The transition priorites may then be set based on ordering of the tunnels in the array.

A graphical code XML parser (e.g., which may call into an XML parser such as Xerces) may be used to parse the XML. As part of parsing the XML, the parser may in some embodiments be able to validate whether the XML file adheres to the appropriate schema, get the XML document from the XML file, get all child XML elements of an XML node, find the node type, node name, and node value of an XML node, get the attribute value provided an XML node and the attribute name and get all attributes of an XML node, and trim the textual content of an XML element.

In some embodiments, the statechart objects may be created as indicated by the exemplary pseudocode below:

```
For MainDiagram m, call CreateRegion(m)
CreateRegion(Region r)
{
    Call VI to create region.
    ForEach(child c of Region r)
        If(c is state)
            CreateState(c)
        Else If(c is junction)
            CreateJunction(c)
        Else If(c is History)
            CreateHistory(c)
        Else If(c is transition)
            StoreTransition(c)
        and so on......
}
CreateState(State s)
{
    Call VI to create state.
    ForEach(child c of State s)
        If(c is region)
            CreateRegion(c)
        Else If(c is fork)
            CreateFork(c)
        Else If(c is join)
            CreateJoin(c)
}
StoreTransition(Transition t)
{
    Store only the transition information in the place
holder class
    and donot attempt to create the transition.
}
CreateTransitions(MainDiagram diagram)
{
    Traverse the complete diagram and create transitions
}
```

Statechart element creation may be similarly accomplished for other statechart elements.

Alternatively, the XML file may be validated against the appropriate XML schema and parsed using the Xerces XML Library. The DOM parser may be used for parsing the XML file.

In an alternative embodiment, statechart elements may be created as and when encountered. This would not require that any information placeholder classes be maintained. In this case, state elements may need to be created before transitions. For example, the XML file may be parsed for states, regions, forks, joins, junctions, and history nodes in a top-to-bottom fashion before being parsed for transitions.

Figure 17:
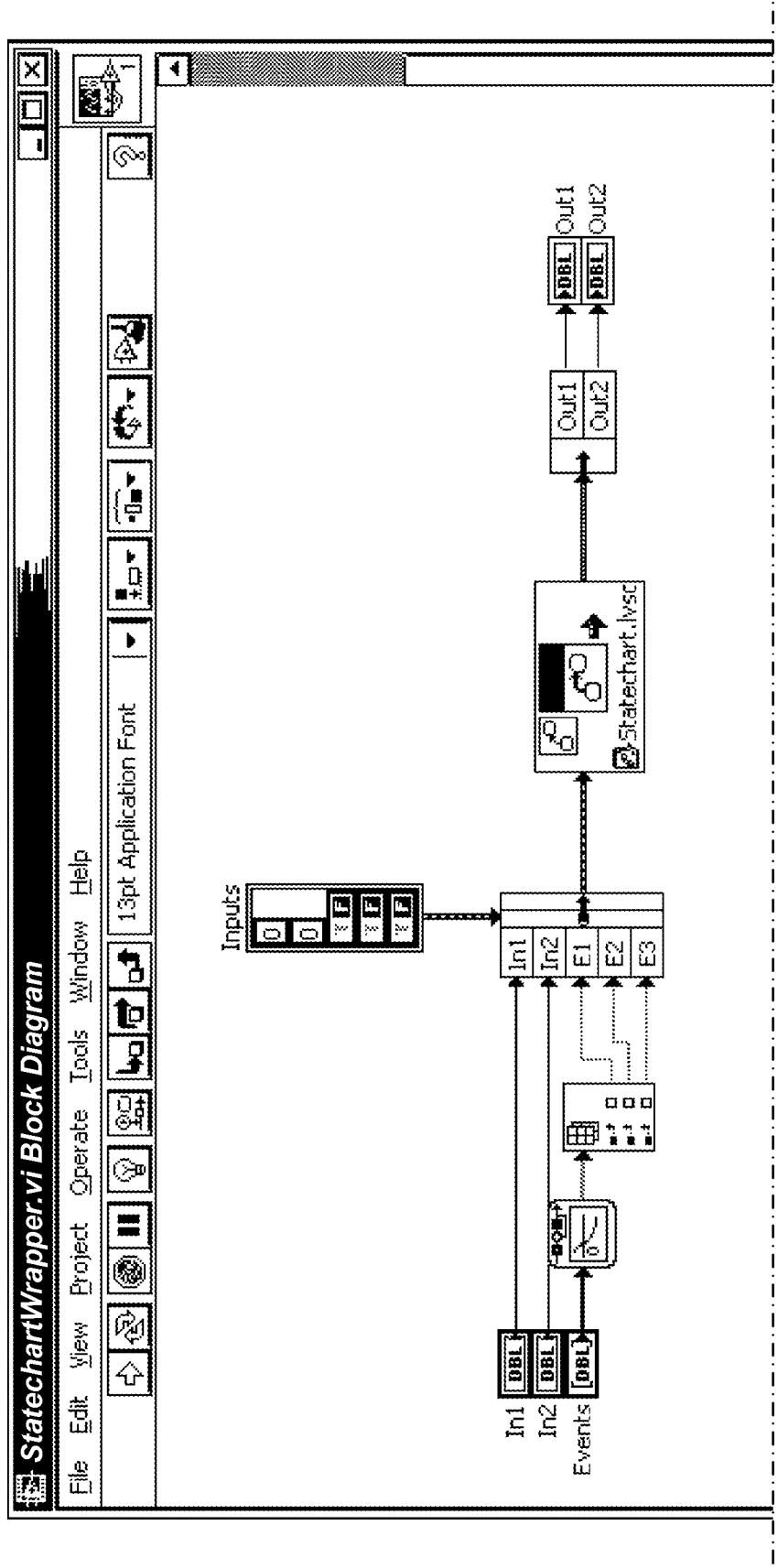
FIG. 17 illustrates a converted statechart according to one embodiment.

As noted above, conversion of a statechart from Stateflow to StateChart may in some embodiments take place within the context of conversion of a Simulink model file into a LabVIEW compatible format. In some embodiments, then, a converted statechart may be placed inside a subsystem VI. This subsystem VI may handle the edge detection for input events, bundling the inputs, calling the statechart, and unbundling the outputs, e.g., allowing the statechart to be placed in a LabVIEW graphical program. A typical wrapper VI is shown in FIG. 17.

A Converter which is converting a Simulink model containing the Stateflow statecharts may take any Stateflow blocks it encounters in the CGD, locate the corresponding StateChart wrapper subsystem VI in the output directory, and drop it in the simulation. Thus to the Converter itself, converted Stateflow blocks may be no different from subsystems, except for the method in which the path to the subsystem is calculated.

One possible alternative to using a converter to interpret the action language and produce corresponding VIs for guards and actions would be to have the StateChart API perform that conversion. However, by utilizing an intermediate format (e.g., a markup language representation), the method may be more modular, and thus may be useful with conversions between other statechart development environments. For example, converters designed for specific statechart development environments may each be designed to convert a format of statechart to the intermediate format, and the StateChart API may then be able to convert statecharts from any statechart represented in the intermediate format to StateChart.

Another alternative to having the Converter interpret the action language would be to simply put the action language text into a MathScript node with appropriate inputs and outputs, since the syntax of action language and MathScript is similar. There are two potential drawbacks to this approach. One, it may introduce a dependency on the MathScript RT module, and an extra dependency may be undesirable. Two, performance and memory footprint of generated StateChart code may be very important to users, especially those creating statechart-based controllers for FPGA or embedded devices. A typical statechart has many guards and actions, each of which is very small. However small the overhead of a MathScript node call may be, that overhead may add up in very large charts. Accordingly, using graphical data flow code may be a preferable solution.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer implemented method for converting a statechart from a first statechart format to a second statechart format, the method comprising:
   utilizing a computer to perform:
   receiving a first statechart, wherein the first statechart is in the first statechart format, wherein the first statechart implements a first functionality;
   parsing the first statechart, wherein said parsing determines a plurality of elements of the first statechart;
   generating a markup language representation representing the first statechart based on said parsing, wherein the markup language representation represents the plurality of elements of the first statechart;
   generating a second statechart based on the markup language representation, wherein the second statechart is in the second statechart format, wherein the second statechart implements the first functionality, wherein the plurality of elements of the first statechart comprise one or more data controls, guards, or actions specified in a textual language, the method further comprising:
 generating one or more graphical data flow diagrams which specify the controls, guards, or actions corresponding to the one or more data controls, guards, or actions, respectively, specified in the textual language of the first statechart;
 wherein said generating the second statechart further comprises including the one or more graphical data flow diagrams specifying the one or more data controls, guards, or actions in the second statechart;
 storing the second statechart in a memory.

2. The computer implemented method of claim 1, wherein the said generating the second statechart is performed via a graphical data flow application programming interface (API).

3. The computer implemented method of claim 1, wherein said generating the second statechart is performed by an application programming interface (API), wherein the method further comprises:
 the API determining that the markup language representation is valid according to a markup language schema;
 the API determining that the first statechart is a valid statechart;
 wherein the API generates an error message if the markup language representation is not valid according to the markup language schema or the first statechart is not a valid statechart.

4. The computer implemented method of claim 1, wherein said receiving the first statechart, parsing the first statechart, generating the markup language representation representing the first statechart, and generating the second statechart are performed automatically in response to user input requesting that the first statechart be converted from the first statechart development environment to the second statechart development environment.

5. The computer implemented method of claim 1, wherein the markup language representation is an eXtensible Markup Language (XML) representation.

6. The computer implemented method of claim 1, wherein the plurality of elements of the first statechart comprise a plurality of state icons and a plurality of connector elements interconnecting the state icons, wherein the state icons represent a plurality of states and wherein the connector elements represent transitions between the states.

7. A non-transitory computer accessible memory medium comprising program instructions for converting a statechart from a first statechart development environment to a second statechart development environment, wherein the program instructions are executable to:
 receive a first statechart, wherein the first statechart is created in a first statechart development environment, wherein the first statechart implements a first functionality;
 parse the first statechart, wherein said parsing determines a plurality of elements of the first statechart;
 generate a markup language representation based on parsing the first statechart, wherein the markup language representation represents the plurality of elements of the first statechart;
 generate a second statechart based on the markup language representation, wherein the second statechart is in a second statechart development environment, wherein the second statechart implements the first functionality, wherein the plurality of elements of the first statechart comprise one or more data controls, guards, or actions specified in a textual language, and wherein the program instructions are further executable to:
 generate one or more graphical data flow diagrams which specify one or more data controls, guards, or actions, wherein the one or more graphical data flow diagrams correspond to the one or more data controls, guards, or actions, respectively, specified in the textual language of the first statechart;
 wherein said generating the second statechart further comprises including the one or more graphical data flow diagrams specifying the one or more data controls, guards, or actions in the second statechart;
 store the second statechart.

8. The non-transitory computer accessible memory medium of claim 1,
 wherein the program instructions executable to generate the second statechart comprise a graphical data flow application programming interface (API).

9. The non-transitory computer accessible memory medium of claim 1, wherein the program instructions executable to generate the second statechart comprise an application programming interface (API), wherein the API is further executable to:
 determine that the markup language representation is valid according to a markup language schema;
 determine that the first statechart is a valid statechart;
 wherein the API is executable to generate an error message if the markup language representation is not valid according to the markup language schema or the first statechart is not a valid statechart.

10. The non-transitory computer accessible memory medium of claim 1,
 wherein the program instructions are executable receive the first statechart, parse the first statechart, generate the markup language representation representing the first statechart, and generate the second statechart automatically in response to user input requesting that the first statechart be converted from the first statechart development environment to the second statechart development environment.

11. The non-transitory computer accessible memory medium of claim 1,
 wherein the markup language representation is an eXtensible Markup Language (XML) representation.

12. The non-transitory computer accessible memory medium of claim 1,
 wherein the plurality of elements of the first statechart comprise a plurality of state icons and a plurality of connector elements interconnecting the state icons, wherein the state icons represent a plurality of states and wherein the connector elements represent transitions between the states.

13. A computer system configured to convert a statechart from a first statechart development environment to a second statechart development environment, the computer system comprising:
 a processor;
 a memory medium comprising program instructions, wherein the program instructions are executable by the processor to:
 receive a first statechart, wherein the first statechart is created in a first statechart development environment, wherein the first statechart implements a first functionality;

parse the first statechart, wherein said parsing determines a plurality of elements of the first statechart;

generate a markup language representation representing the first statechart based on said parsing, wherein the markup language representation represents the plurality of elements of the first statechart;

generate a second statechart based on the markup language representation, wherein the second statechart is in a second statechart development environment, wherein the second statechart implements the first functionality, wherein the plurality of elements of the first statechart comprise one or more data controls, guards, or actions specified in a textual language, wherein the program instructions are further executable to:

generate one or more graphical data flow diagrams which specify one or more data controls, guards, or actions, wherein the one or more graphical data flow diagrams correspond to the one or more data controls, guards, or actions, respectively, specified in the textual language of the first statechart;

wherein said generating the second statechart further comprises including the one or more graphical data flow diagrams specifying the one or more data controls, guards, or actions in the second statechart;

store the second statechart.

14. The computer system of claim 13, wherein the program instructions executable to generate the second statechart comprise a graphical data flow application programming interface (API).

15. The computer system of claim 13, wherein the program instructions executable to generate the second statechart comprise an application programming interface (API), wherein the API is further executable to:

determine that the markup language representation is valid according to a markup language schema;

determine that the first statechart is a valid statechart;

wherein the API is executable to generate an error message if the markup language representation is not valid according to the markup language schema or the first statechart is not a valid statechart.

16. The computer system of claim 13, wherein the program instructions are executable receive the first statechart, parse the first statechart, generate the markup language representation representing the first statechart, and generate the second statechart automatically in response to user input requesting that the first statechart be converted from the first statechart development environment to the second statechart development environment.

17. The computer system of claim 13, wherein the plurality of elements of the first statechart comprise a plurality of state icons and a plurality of connector elements interconnecting the state icons, wherein the state icons represent a plurality of states and wherein the connector elements represent transitions between the states.

* * * * *